(12) United States Patent
Suzuki et al.

(10) Patent No.: US 10,377,444 B2
(45) Date of Patent: Aug. 13, 2019

(54) BICYCLE ELECTRIC COMPONENT

(71) Applicant: SHIMANO INC., Sakai (JP)

(72) Inventors: Takafumi Suzuki, Sakai (JP); Takaya Masuda, Sakai (JP); Toshihiko Takahashi, Sakai (JP); Masafumi Tanaka, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/665,315

(22) Filed: Jul. 31, 2017

(65) Prior Publication Data
US 2019/0031283 A1    Jan. 31, 2019

(51) Int. Cl.
| B62M 6/50 | (2010.01) |
| G08C 17/02 | (2006.01) |
| B62M 6/55 | (2010.01) |
| B62M 6/90 | (2010.01) |
| B62K 25/08 | (2006.01) |
| B62M 9/122 | (2010.01) |
| B62M 25/08 | (2006.01) |
| B62J 1/08 | (2006.01) |
| B62K 23/02 | (2006.01) |
| B62J 99/00 | (2009.01) |
| B62K 25/04 | (2006.01) |

(52) U.S. Cl.
CPC ............. *B62M 6/50* (2013.01); *B62J 1/08* (2013.01); *B62K 23/02* (2013.01); *B62K 25/08* (2013.01); *B62M 6/55* (2013.01); *B62M 6/90* (2013.01); *B62M 9/122* (2013.01); *B62M 25/08* (2013.01); *G08C 17/02* (2013.01); *B62J 2001/085* (2013.01); *B62J 2099/002* (2013.01); *B62J 2099/004* (2013.01); *B62K 2025/045* (2013.01); *B62K 2025/047* (2013.01); *B62K 2025/048* (2013.01)

(58) Field of Classification Search
CPC ........... G08C 17/02; B62M 6/50; B62M 6/55; B62M 6/80; B62M 6/90; B62M 25/00; B62M 25/08; B62J 2099/002; B62J 2099/004; B62J 2099/0006; B62J 2099/0013; F16H 59/0217; F16H 59/044; F16H 59/105
USPC .......................... 340/12.5, 3.1, 539.3, 693.3
See application file for complete search history.

(56) References Cited

U.S. PATENT DOCUMENTS

| 2003/0092519 A1* | 5/2003 | Fukuda | B62M 9/122 474/70 |
| 2003/0188594 A1* | 10/2003 | Levin | F16H 59/044 74/473.12 |
| 2009/0240858 A1* | 9/2009 | Takebayashi | B62M 25/08 710/110 |

(Continued)

*Primary Examiner* — Edwin C Holloway, III
(74) *Attorney, Agent, or Firm* — Mori & Ward, LLP

(57) ABSTRACT

A bicycle electric component comprises a wireless communicator and a detector. The wireless communicator is configured to receive a wireless signal. The wireless communicator has a first operating mode and a second operating mode. A power consumption of the second operating mode is lower than a power consumption of the first operating mode. The detector is to detect an operational state of a bicycle. The wireless communicator is configured to change from the second operating mode to the first operating mode in a state where the wireless communicator receives the wireless signal and the detector detects the operational state of the bicycle.

9 Claims, 20 Drawing Sheets

(56) References Cited

U.S. PATENT DOCUMENTS

2012/0035011 A1* 2/2012 Menachem ............ B62M 9/122
                                                   474/126
2014/0102237 A1* 4/2014 Jordan ................... B62K 23/02
                                                  74/473.12

* cited by examiner

BICYCLE ELECTRIC COMPONENT

BACKGROUND OF THE INVENTION

Field of the Invention

The present invention relates to a bicycle electric component.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle electric component.

SUMMARY OF THE INVENTION

In accordance with a first aspect of the present invention, a bicycle electric component comprises a wireless communicator and a detector. The wireless communicator is configured to receive a wireless signal. The wireless communicator has a first operating mode and a second operating mode. A power consumption of the second operating mode is lower than a power consumption of the first operating mode. The detector is to detect an operational state of a bicycle. The wireless communicator is configured to change from the second operating mode to the first operating mode in a state where the wireless communicator receives the wireless signal and the detector detects the operational state of the bicycle.

With the bicycle electric component according to the first aspect, it is possible to reduce power consumption when the bicycle is not operated.

In accordance with a second aspect of the present invention, the bicycle electric component according to the first aspect comprises a bicycle component controller configured to change from the first operating mode to the second operating mode in a state where the detector has not detected the operational state of the bicycle for a first threshold time period.

With the bicycle electric component according to the second aspect, it is possible to change to the second operating mode in which a power consumption is small after the bicycle operation is finished. Accordingly, it is possible to further reduce power consumption.

In accordance with a third aspect of the present invention, the bicycle electric component according to the first or second aspect comprises a bicycle component controller configured to change from the first operating mode to the second operating mode in a state where the wireless communicator has not received the wireless signal for a second threshold time period.

With the bicycle electric component according to the third aspect, it is possible to change to the second operating mode in which a power consumption is small when it is presumed that the bicycle is not used. Accordingly, it is possible to further reduce power consumption.

In accordance with a fourth aspect of the present invention, a bicycle electric component comprises a wireless communicator, a power source, and a switcher. The wireless communicator is configured to receive a wireless signal. The power source is configured to supply a first electric power to the wireless communicator. The switcher is configured to change an electric connection state between the wireless communicator and the power source. The switcher includes an electric generator configured to generate a second electric power by an external input to a bicycle.

With the bicycle electric component according to the fourth aspect, the switcher is configured to connect the wireless communicator and the power source when the bicycle is operated. Accordingly, it is possible to reduce power consumption when the bicycle is not operated.

In accordance with a fifth aspect of the present invention, the bicycle electric component according to the fourth aspect is configured so that the switcher is configured to change the electric connection state between the wireless communicator and the power source to an electrically connected state when the electric generator of the switcher generates the electric power by the external input to the bicycle.

With the bicycle electric component according to the fifth aspect, it is possible to further reduce power consumption when the bicycle is not operated.

In accordance with a sixth aspect of the present invention, a bicycle electric component comprises a wireless communicator, a casing, and an electromagnetic shield. The wireless communicator is configured to receive a wireless signal. The casing has an internal space. The wireless communicator is disposed in the internal space of the casing. The electromagnetic shield includes a shield member to cover at least a part of the wireless communicator. The shield member of the electromagnetic shield is a separate member with respect to the casing.

With the bicycle electric component according to the sixth aspect, a user can move the electromagnetic shield to cover the at least a part of the wireless communicator WC to disable or reduce wireless communication when the user does not operate the bicycle. Accordingly, it is possible to reduce power consumption when the bicycle is not operated.

In accordance with a seventh aspect of the present invention, the bicycle electric component according to the sixth aspect is configured so that the casing includes a first connecting member. The electromagnetic shield includes a second connecting member to detachably connect the shield member to the first connecting member.

With the bicycle electric component according to the seventh aspect, the casing and the electromagnetic shield have simple structure enough for the user to move the electromagnetic shield manually.

In accordance with an eighth aspect of the present invention, the bicycle electric component according to the sixth aspect further comprises a detector and a shield actuator. The detector is to detect an operational state of a bicycle. The shield actuator is to move the shield member in response to the operational state of the bicycle.

With the bicycle electric component according to the eighth aspect, the shield actuator can automatically move the electromagnetic shield to cover the at least a part of the wireless communicator to disable or reduce wireless communication when the bicycle is not operated. Accordingly, the bicycle electric component can provide convenience to a user.

In accordance with a ninth aspect of the present invention, the bicycle electric component according to the eighth aspect is configured so that the casing includes a third connecting member. The electromagnetic shield includes a fourth connecting member to movably connect the shield member to the third connecting member.

With the bicycle electric component according to the ninth aspect, the casing and the electromagnetic shield have simple structure enough for the shield actuator to move the electromagnetic shield automatically.

In accordance with a tenth aspect of the present invention, the bicycle electric component according to the eighth or ninth aspect is configured so that the shield actuator is configured to move the shield member to uncover at least a part of the wireless communicator in a state where the detector detects the operational state of the bicycle.

With the bicycle electric component according to the tenth aspect, the shield actuator can automatically move the electromagnetic shield to uncover the at least a part of the wireless communicator to enable or increase wireless communication when the bicycle is operated. Accordingly, the bicycle electric component can provide more convenience to a user.

In accordance with an eleventh aspect of the present invention, the bicycle electric component according to the tenth aspect is configured so that the shield actuator is configured to move the shield member to cover the at least a part of the wireless communicator in a state where the detector has not detected the operational state of the bicycle for a third threshold time period.

With the bicycle electric component according to the eleventh aspect, the user does not need any operation to cover the at least a part of the wireless communicator to disable or decrease wireless communication when the bicycle is not operated. Accordingly, the bicycle electric component can provide further convenience to a user.

In accordance with a twelfth aspect of the present invention, the bicycle electric component according to the tenth or eleventh aspect is configured so that the shield actuator is configured to move the shield member to cover the at least a part of the wireless communicator in a state where the wireless communicator has not received the wireless signal for a fourth threshold time period.

With the bicycle electric component according to the twelfth aspect, the shield actuator can automatically move the electromagnetic shield to cover the at least a part of the wireless communicator to disable or reduce wireless communication when it is presumed that the bicycle is not used. Accordingly, it is possible to further reduce power consumption.

In accordance with a thirteenth aspect of the present invention, the bicycle electric component comprises a detector and a wireless communicator. The detector is to detect an operational state of a bicycle. The wireless communicator is configured to receive a wireless signal. The wireless communicator includes a sensitivity changer to change a sensitivity of the wireless communicator. The sensitivity changer increases the sensitivity of the wireless communicator in a state where the detector detects the operational state of the bicycle.

With the bicycle electric component according to the thirteenth aspect, it is possible to decrease wireless communication while the bicycle is not operated. Accordingly, it is possible to reduce power consumption when the bicycle is not operated.

In accordance with a fourteenth aspect of the present invention, the bicycle electric component according to the thirteenth aspect is configured so that the wireless communicator includes a receiving circuit and an antenna. The sensitivity changer is configured to electrically disconnect the receiving circuit and the antenna to reduce the sensitivity of the wireless communicator in a state where the detector has not detected the operational state of the bicycle for a fifth threshold time period.

With the bicycle electric component according to the fourteenth aspect, it is possible to disable wireless communication while the bicycle is not operated. Accordingly, it is possible to further reduce power consumption when the bicycle is not operated.

In accordance with a fifteenth aspect of the present invention, the bicycle electric component according to the thirteenth or fourteenth aspect is configured so that the wireless communicator includes a receiving circuit and an antenna. The sensitivity changer is configured to electrically disconnect the receiving circuit and the antenna to reduce the sensitivity of the wireless communicator in a state where the wireless communicator has not received the wireless signal for a sixth threshold time period.

With the bicycle electric component according to the fifteenth aspect, it is possible to disable wireless communication while it is presumed that the bicycle is not operated. Accordingly, it is possible to further reduce power consumption when the bicycle is not operated.

In accordance with a sixteenth aspect of the present invention, the bicycle electric component according to the thirteenth aspect is configured so that the wireless communicator includes at least one amplifier. The sensitivity changer is configured to decrease a gain of the at least one amplifier in a state where the detector has not detected the operational state of the bicycle for a seventh threshold time period.

With the bicycle electric component according to the sixteenth aspect, it is possible to decrease wireless communication while the bicycle is not operated. Accordingly, it is possible to further reduce power consumption when the bicycle is not operated.

In accordance with a seventeenth aspect of the present invention, the bicycle electric component according to the thirteenth or sixteenth aspect is configured so that the wireless communicator includes at least one amplifier. The sensitivity changer is configured to decrease a gain of the at least one amplifier in a state where the wireless communicator has not received the wireless signal for an eighth threshold time period.

With the bicycle electric component according to the seventeenth aspect, it is possible to decrease wireless communication while it is presumed that the bicycle is not operated. Accordingly, it is possible to further reduce power consumption when the bicycle is not operated.

In accordance with an eighteen aspect of the present invention, the bicycle electric component according to the thirteenth aspect is configured so that the wireless communicator includes at least one band pass filter. The sensitivity changer is configured to control the at least one band pass filter to block the wireless signal in a state where the detector has not detected the operational state of the bicycle for a ninth threshold time period.

With the bicycle electric component according to the eighteenth aspect, it is possible to decrease wireless communication while the bicycle is not operated. Accordingly, it is possible to further reduce power consumption when the bicycle is not operated.

In accordance with a nineteenth aspect of the present invention, the bicycle electric component according to the thirteenth or eighteenth aspect is configured so that the wireless communicator includes at least one band pass filter. The sensitivity changer is configured to control the at least one band pass filter to block the wireless signal in a state where the wireless communicator has not received the wireless signal for a tenth threshold time period.

With the bicycle electric component according to the nineteenth aspect, it is possible to decrease wireless communication while it is presumed that the bicycle is not operated. Accordingly, it is possible to further reduce power consumption when the bicycle is not operated.

In accordance with a twentieth aspect of the present invention, the bicycle electric component according to any one of the first to nineteenth aspects is configured so that the detector includes at least one of a vibration sensor, a pressure sensor, a rotation sensor, a strain sensor, and a bicycle lock-state sensor.

With the bicycle electric component according to the twentieth aspect, the operational state of the bicycle can be detected based on an output from the at least one of the vibration sensor, the pressure sensor, the rotation sensor, the strain sensor, and the bicycle lock-state sensor. Accordingly, it is possible to reduce power consumption when the bicycle is not operated.

In accordance with a twenty-first aspect of the present invention, the bicycle electric component according to any one of the first to twentieth aspects comprises at least one of a derailleur, an adjustable seatpost, a suspension, and an auxiliary drive unit.

With the bicycle electric component according to the twenty-first aspect, it is possible to reduce power consumption in wireless communication between the bicycle electric component and an operation controller of the bicycle when the bicycle is not operated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
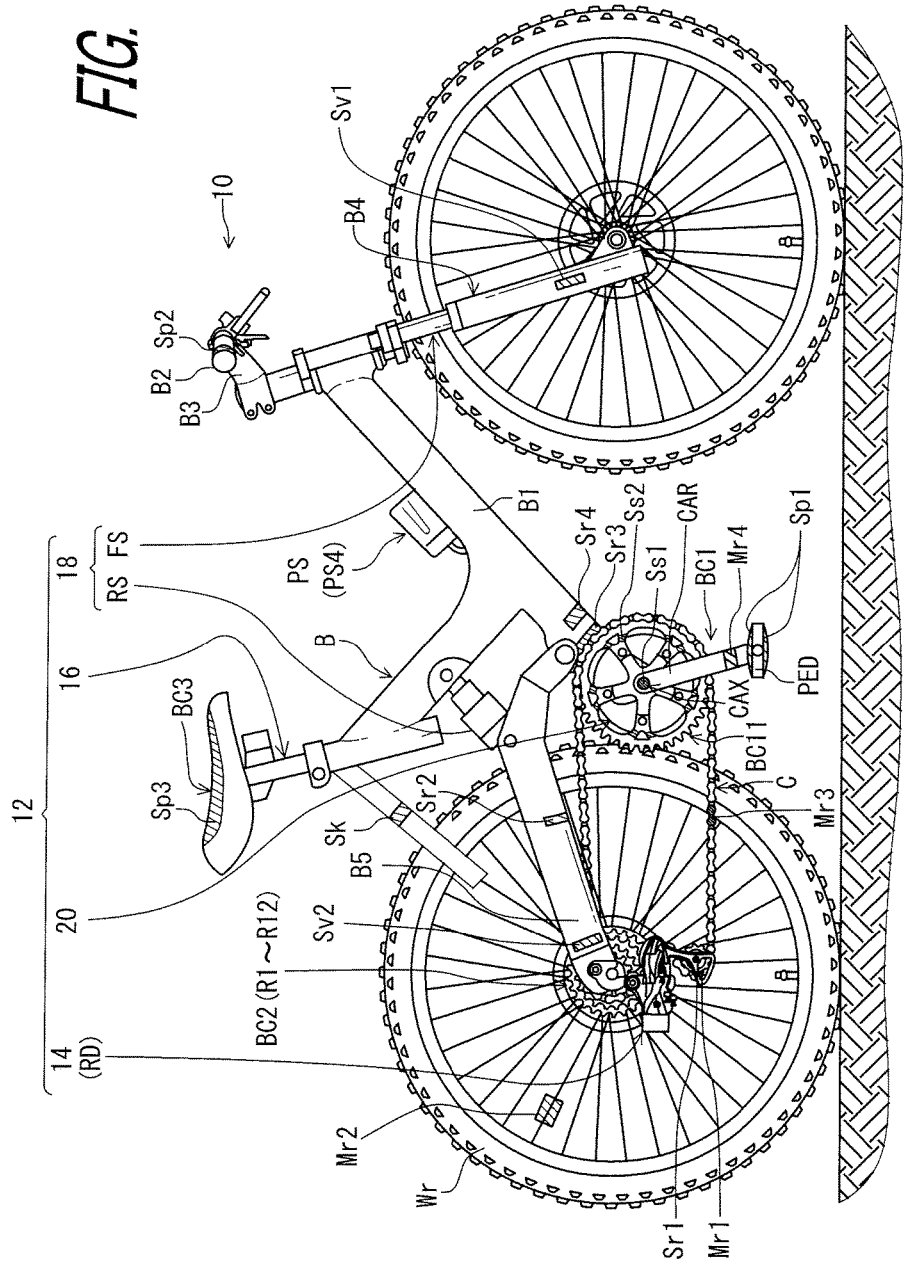
FIG. 1 is a side elevational view of a bicycle provided with a bicycle electric component in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 includes a bicycle electric component 12 in accordance with a first embodiment. While the bicycle 10 is illustrated as a mountain bike, the bicycle electric component 12 can be applied to a road bike or any type of bicycle.

The bicycle electric component 12 comprises at least one of a derailleur (a bicycle rear derailleur RD) 14, an adjustable seatpost 16, a suspension (an electric front suspension FS, an electric rear suspension RS) 18, and an auxiliary drive unit 20. However, the bicycle electric component 12 can include another electric device such as an electric internal hub transmission, an electric continuously variable transmission, and an electric gearbox.

As seen in FIG. 1, the bicycle 10 includes a bicycle body B, a crank assembly BC1, a rear sprocket assembly BC2, a saddle BC3, and a bicycle chain C. The bicycle body B includes a bicycle frame B1, a handlebar B2, a stem B3, a front fork B4, and a rear swing arm B5. The handlebar B2 is coupled to the front fork B4 with the stem B3. The electric front suspension FS is mounted to the front fork B4. The electric rear suspension RS couples the bicycle frame B1 to the rear swing arm B5. The saddle BC3 is attached to the adjustable seatpost 16. The adjustable seatpost 16 is mounted to the bicycle body B to change a position of the saddle BC3 relative to the bicycle body B.

The bicycle chain C engages with a front sprocket BC11 of the crank assembly BC1 and the rear sprocket assembly BC2. The derailleur 14 (the bicycle rear derailleur RD) shifts the bicycle chain C relative to the rear sprocket assembly BC2 to change a speed stage. In the illustrated embodiment, the front sprocket BC11 is a single (solitary) sprocket in the crank assembly BC1 while the rear sprocket assembly BC2 has twelve speed stages. However, the crank assembly BC1 can include a plurality of front sprockets. In such an embodiment, the bicycle 10 includes, as the derailleur 14, a front derailleur configured to shift the bicycle chain C relative to the plurality of front sprockets.

The bicycle 10 includes the auxiliary drive unit 20 mounted to the bicycle body B to assist pedaling. The auxiliary drive unit 20 is configured to generate an auxiliary drive force in accordance with a pedaling torque. The auxiliary drive unit 20 is coupled to the crank assembly BC1 to transmit the auxiliary drive force to the crank assembly BC1. The auxiliary drive unit 20 can be omitted from the bicycle electric component 12.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 with facing the handlebar B2. Accordingly, these terms, as utilized to describe the bicycle electric component 12, should be interpreted relative to the bicycle 10 equipped with the bicycle electric component 12 as used in an upright riding position on a horizontal surface.

As seen in FIG. 1, the rear sprocket assembly BC2 includes first to twelfth rear sprockets R1 to R12. Each of the first to twelfth rear sprockets R1 to R12 has a different total number of teeth. A total number of the rear sprockets R1 to R12 is not limited to this embodiment. The first rear sprocket R1 has the largest number of teeth in the rear sprocket assembly BC2. The twelfth rear sprocket R12 has the smallest number of teeth in the rear sprocket assembly BC2. The first rear sprocket R1 corresponds to low gear. The twelfth rear sprocket R12 corresponds to top gear. The bicycle electric component 12 is configured to shift the bicycle chain C relative to the first to twelfth rear sprockets R1 to R12 to change a gear stage of the bicycle 10.

Bicycle Electric Operating Device

Figure 2:
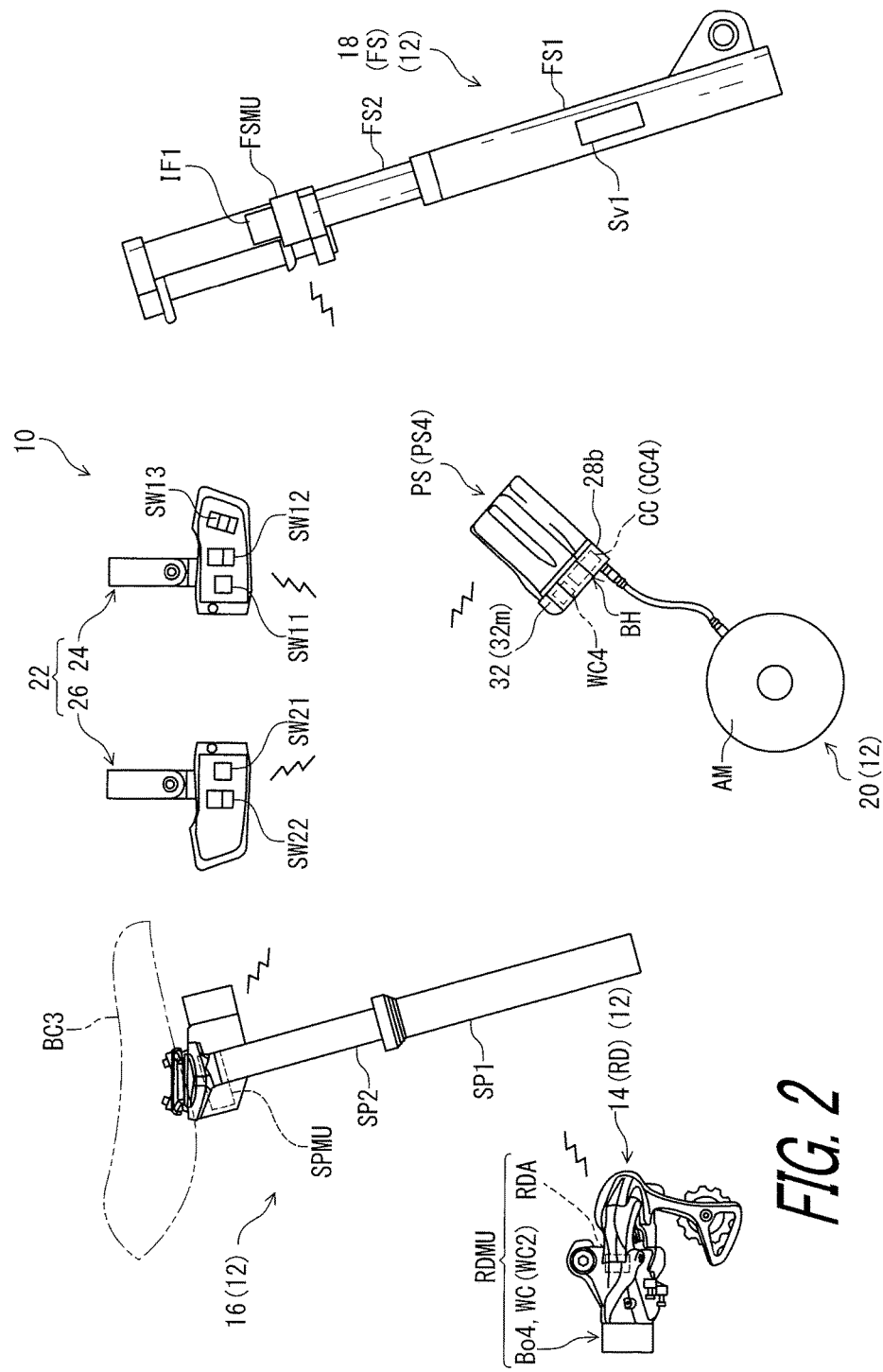
FIG. 2 is a diagrammatic view of the bicycle electric component and a bicycle electric operating device illustrated in FIG. 1.

As seen in FIG. 2, the bicycle 10 comprises a bicycle electric operating device 22. The bicycle electric operating device 22 is mounted to the handlebar B2 (FIG. 1). The bicycle electric operating device 22 includes a first operating device 24 and a second operating device 26. The first operating device 24 and the second operating device 26 are mounted to the handlebar B2 (FIG. 1). The first operating device 24 is a right-hand control device. The second operating device 26 is a left-hand control device. However, the bicycle electric operating device 22 can include another operating device instead of or in addition to the first operating device 24 and the second operating device 26. One of the first operating device 24 and the second operating device 26 can be omitted from the bicycle electric operating device 22.

In this embodiment, the bicycle electric operating device 22 is wirelessly connected to the bicycle electric component 12. More specifically, the first operating device 24 and the second operating device 26 are wirelessly connected to at least one of the derailleur 14, the adjustable seatpost 16, the suspension 18, and the auxiliary drive unit 20. In FIG. 2, only the bicycle rear derailleur RD is illustrated as the derailleur 14, and only the electric front suspension FS is illustrated as the suspension 18. However, the electric rear suspension RS is also wirelessly connected to the bicycle electric operating device 22, and a front derailleur, which is not illustrated, can be wirelessly connected to the bicycle electric operating device 22.

Figure 3:
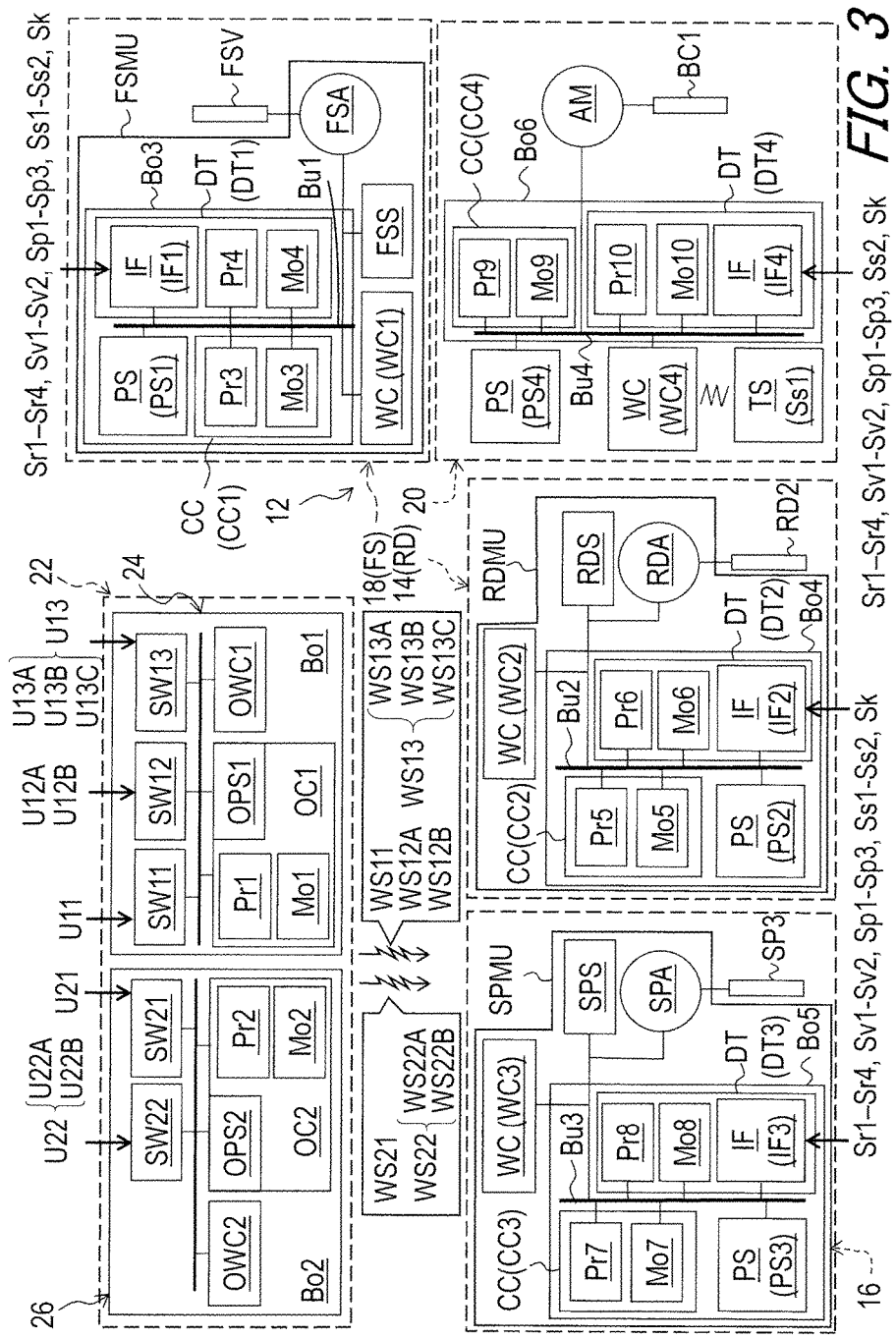
FIG. 3 is a schematic block diagram of the bicycle electric component and the bicycle electric operating device illustrated in FIG. 1.

As seen in FIG. 3, the first operating device 24 is configured to receive an upshift user input U11 from the user. The second operating device 26 is configured to receive a downshift user input U21 from the user. The first operating device 24 is configured to wirelessly transmit an upshift control signal WS11 to the bicycle electric component 12 in response to the upshift user input U11. The second operating device 26 is configured to wirelessly transmit a downshift control signal WS21 to the bicycle electric component 12 in response to the downshift user input U21. More specifically, the upshift control signal WS11 and the downshift control signal WS21 are transmitted to the derailleur 14 (the bicycle rear derailleur RD).

The first operating device 24 is configured to receive an unlock user input U12A and a lock user input U12B. The first operating device 24 is configured to wirelessly transmit an unlock control signal WS12A to the suspension 18 (the bicycle electric component 12) in response to the unlock user input U12A. The first operating device 24 is configured to wirelessly transmit a lock control signal WS12B to the suspension 18 (the bicycle electric component 12) in response to the lock user input U12B. The suspension 18 has an unlocked state and a locked state and changes a state between the unlocked state and the locked state based on the unlock control signal WS12A and the lock control signal WS12B.

The first operating device 24 is configured to receive an assist user input U13. The assist user input U13 includes a first-mode user input U13A, a second-mode user input U13B, and a third-mode user input U13C. The first operating device 24 is configured to wirelessly transmit a first-mode control signal WS13A to the auxiliary drive unit 20 (the bicycle electric component 12) in response to the first-mode user input U13A. The first operating device 24 is configured to wirelessly transmit a second-mode control signal WS13B to the auxiliary drive unit 20 (the bicycle electric component 12) in response to the second-mode user input U13B. The first operating device 24 is configured to wirelessly transmit a third-mode control signal WS13C to the auxiliary drive unit 20 (the bicycle electric component 12) in response to the third-mode user input U13C.

The second operating device 26 is configured to receive a seatpost user input U22. The seatpost user input U22 includes a first seatpost user input U22A and a second seatpost user input U22B. The second operating device 26 is configured to wirelessly transmit a first seatpost control signal WS22A to the adjustable seatpost 16 (the bicycle electric component 12) in response to the first seatpost user input U22A. The second operating device 26 is configured to wirelessly transmit a second seatpost control signal WS22B to the adjustable seatpost 16 (the bicycle electric component 12) in response to the second seatpost user input U22B. The adjustable seatpost 16 shortens an overall length based on the first seatpost control signal WS22A. The adjustable seatpost 16 lengthens the overall length based on the second seatpost control signal WS22B.

As seen in FIG. 3, the first operating device 24 includes an upshift switch SW11, a lock operation switch SW12, an assist operation switch SW13, a first operation controller OC1, a first operation wireless communicator OWC1, and a first circuit board Bo1. The upshift switch SW11, the lock operation switch SW12, the assist operation switch SW13, the first operation controller OC1, and the first operation wireless communicator OWC1 are electrically mounted on the first circuit board Bo1. The upshift switch SW11 is configured to receive the upshift user input U11 from the user. The lock operation switch SW12 is configured to receive the unlock user input U12A and the lock user input U12B from the user. The assist operation switch SW13 is configured to receive the assist user input U13 from the user. For example, as seen in FIG. 2, the upshift switch SW11 includes a push-button switch. The lock operation switch SW12 includes two-position switch having two positions corresponding to the unlock user input U12A and the lock user input U12B. The assist operation switch SW13 includes a three-position switch having three positions corresponding to the first-mode to third-mode user input U13A to U13C.

The first operation controller OC1 is electrically connected to the upshift switch SW11 to generate the upshift control signal WS11 in response to the upshift user input U11 received by the upshift switch SW11. The first operation controller OC1 is electrically connected to the lock operation switch SW12 to generate the unlock control signal WS12A in response to the unlock user input U12A received by the lock operation switch SW12. The first operation controller OC1 is electrically connected to the lock operation switch SW12 to generate the lock control signal WS12B in response to the lock user input U12B received by the lock operation switch SW12.

The first operation controller OC1 is electrically connected to the assist operation switch SW13 to generate an assist control signal WS13 in response to the assist user input U13 received by the assist operation switch SW13. Specifically, the first operation controller OC1 is configured to generate the first-mode control signal WS13A in response to the first-mode user input U13A received by the assist operation switch SW13. The first operation controller OC1 is configured to generate the second-mode control signal WS13B in response to the second-mode user input U13B received by the assist operation switch SW13. The first operation controller OC1 is configured to generate the third-mode control signal WS13C in response to the third-mode user input U13C received by the assist operation switch SW13.

In this embodiment, the first operation controller OC1 includes a processor Pr1, a memory Mo1, and a first operation controller power supply OPS1. The processor Pr1 and the memory Mo1 are electrically mounted on the first circuit board Bo1. The processor Pr1 includes a central processing unit (CPU) and a memory controller. The memory Mo1 is electrically connected to the processor Pr1. The memory Mo1 includes a read only memory (ROM) and a random-access memory (RAM). The ROM includes a non-transitory computer-readable storage medium. The RAM includes a transitory computer-readable storage medium. The memory Mo1 includes storage areas each having an address in the ROM and the RAM. The processor Pr1 controls the memory Mo1 to store data in the storage areas of the memory Mo1 and reads data from the storage areas of the memory Mo1. The memory Mo1 (e.g., the ROM) stores a program. The program is read into the processor Pr1, and thereby functions of the first operation controller OC1 is performed.

The memory Mo1 stores identification information ID11 of the first operating device 24. The identification information ID11 of the first operating device 24 includes a unique device identifier (ID) (e.g., a value indicative of a shift operating device) of the first operating device 24. The identification information ID11 of the first operating device 24 further includes a value indicative of a device type such as "right-hand side" or "left-hand side."

The first operation controller power supply OPS1 is electrically connected to the first operation controller OC1, the upshift switch SW11, the lock operation switch SW12, the assist operation switch SW13, and the first operation wireless communicator OWC1 to supply electricity to the first operation controller OC1, the upshift switch SW11, the lock operation switch SW12, the assist operation switch SW13, and the first operation wireless communicator OWC1. The first operation controller power supply OPS1 can include a primary battery such as a lithium manganese dioxide battery and a secondary battery such as a lithium-ion secondary battery. However, the first operation controller power supply OPS1 can include an electricity generation element configured to generate the electricity using pressure and/or vibration caused by an operation of the upshift switch SW11, the lock operation switch SW12, the assist operation switch SW13. In this embodiment, the first operation controller power supply OPS1 includes a primary button battery.

The first operation wireless communicator OWC1 includes a signal transmitting circuit, a signal receiving circuit, and an antenna. Thus, the first operation wireless communicator OWC1 can also be referred to as a first operation wireless communication circuit or circuitry OWC1. The first operation wireless communicator OWC1 is electrically connected to the first operation controller OC1 to wirelessly transmit the upshift control signal WS11, the unlock control signal WS12A, the lock control signal WS12B, and the first-mode to third-mode control signals WS13A to WS13C to the bicycle electric component 12 (the derailleur 14, the suspension 18, and the auxiliary drive unit 20). The first operation wireless communicator OWC1 is configured to wirelessly transmit the upshift control signal WS11, the unlock control signal WS12A, the lock control signal WS12B, and the first-mode to third-mode control signals WS13A to WS13C including the identification information ID11. The first operation wireless communicator OWC1 can be configured to superimpose the upshift control signal WS11, the unlock control signal WS12A, the lock control signal WS12B, and the first-mode to third-mode control signals WS13A to WS13C on carrier wave using a predetermined wireless communication protocol.

As seen in FIG. 3, the second operating device 26 includes a downshift switch SW21, a seatpost operation switch SW22, a second operation controller OC2, a second operation wireless communicator OWC2, and a second circuit board Bo2. The downshift switch SW21, the seatpost operation switch SW22, the second operation controller OC2, and the second operation wireless communicator OWC2 are electrically mounted on the second circuit board Bo2. The downshift switch SW21 is configured to receive the downshift user input U21 from the user. The seatpost operation switch SW22 is configured to receive the seatpost user input U22 from the user. For example, as seen in FIG. 2, the downshift switch SW21 includes a push-button switch. The seatpost operation switch SW22 includes a two-position switch having two positions corresponding to the first and second seatpost user inputs U22A and U22B.

The second operation controller OC2 is electrically connected to the downshift switch SW21 to generate the downshift control signal WS21 in response to the downshift user input U21 received by the downshift switch SW21. The second operation controller OC2 is electrically connected to the seatpost operation switch SW22 to generate a seatpost control signal WS22 in response to the seatpost user input U22 received by the seatpost operation switch SW22. Specifically, the second operation controller OC2 is configured to generate the first seatpost control signal WS22A in response to the first seatpost user input U22A received by the seatpost operation switch SW22. The second operation controller OC2 is configured to generate the second seatpost control signal WS22B in response to the second seatpost user input U22B received by the seatpost operation switch SW22.

In this embodiment, the second operation controller OC2 includes a processor Pr2, a memory Mo2, and a second operation controller power supply OPS2. The processor Pr2 and the memory Mo2 are electrically mounted on the second circuit board Bo2. The processor Pr2 includes a CPU and a memory controller. The memory Mo2 is electrically connected to the processor Pr2. The memory Mo2 includes a ROM and a RAM. The ROM includes a non-transitory computer-readable storage medium. The RAM includes a transitory computer-readable storage medium. The memory Mo2 includes storage areas each having an address in the ROM and the RAM. The processor Pr2 controls the memory Mo2 to store data in the storage areas of the memory Mo2 and reads data from the storage areas of the memory Mo2. The memory Mo2 (e.g., the ROM) stores a program. The program is read into the processor Pr2, and thereby functions of the second operation controller OC2 is performed.

The memory Mo2 stores identification information ID12 of the second operating device 26. The identification information ID12 of the second operating device 26 includes a unique device identifier (ID) (e.g., a value indicative of a shift operating device) of the second operating device 26. The identification information ID12 of the second operating device 26 further includes a value indicative of a device type such as "right-hand side" or "left-hand side."

The second operation controller power supply OPS2 is electrically connected to the second operation controller OC2, the downshift switch SW21, the seatpost operation switch SW22, and the second operation wireless communicator OWC2 to supply electricity to the second operation controller OC2, the downshift switch SW21, the seatpost operation switch SW22, and the second operation wireless communicator OWC2. The second operation controller power supply OPS2 can include a primary battery such as a lithium manganese dioxide battery, and a secondary battery such as a lithium-ion secondary battery. However, the second operation controller power supply OPS2 can include an electricity generation element configured to generate the electricity using pressure and/or vibration caused by an operation of the downshift switch SW21 and the seatpost operation switch SW22. In this embodiment, the second operation controller battery OPS2 includes a primary button battery.

The second operation wireless communicator OWC2 includes a signal transmitting circuit, a signal receiving circuit, and an antenna. Thus, the second operation wireless communicator OWC2 can also be referred to as a second operation wireless communication circuit or circuitry OWC2. The second operation wireless communicator OWC2 is electrically connected to the second operation controller OC2 to wirelessly transmit the downshift control signal WS21 and the seatpost control signal WS22 to the bicycle electric component 12 (the derailleur 14 and the adjustable seatpost 16). The second operation wireless communicator OWC2 is configured to wirelessly transmit the downshift control signal WS21 and the seatpost control signal WS22 including the identification information ID12. The second operation wireless communicator OWC2 can be configured to superimpose the downshift control signal WS21 and the seatpost control signal WS22 on carrier wave using a predetermined wireless communication protocol.

Suspension

Figure 4:
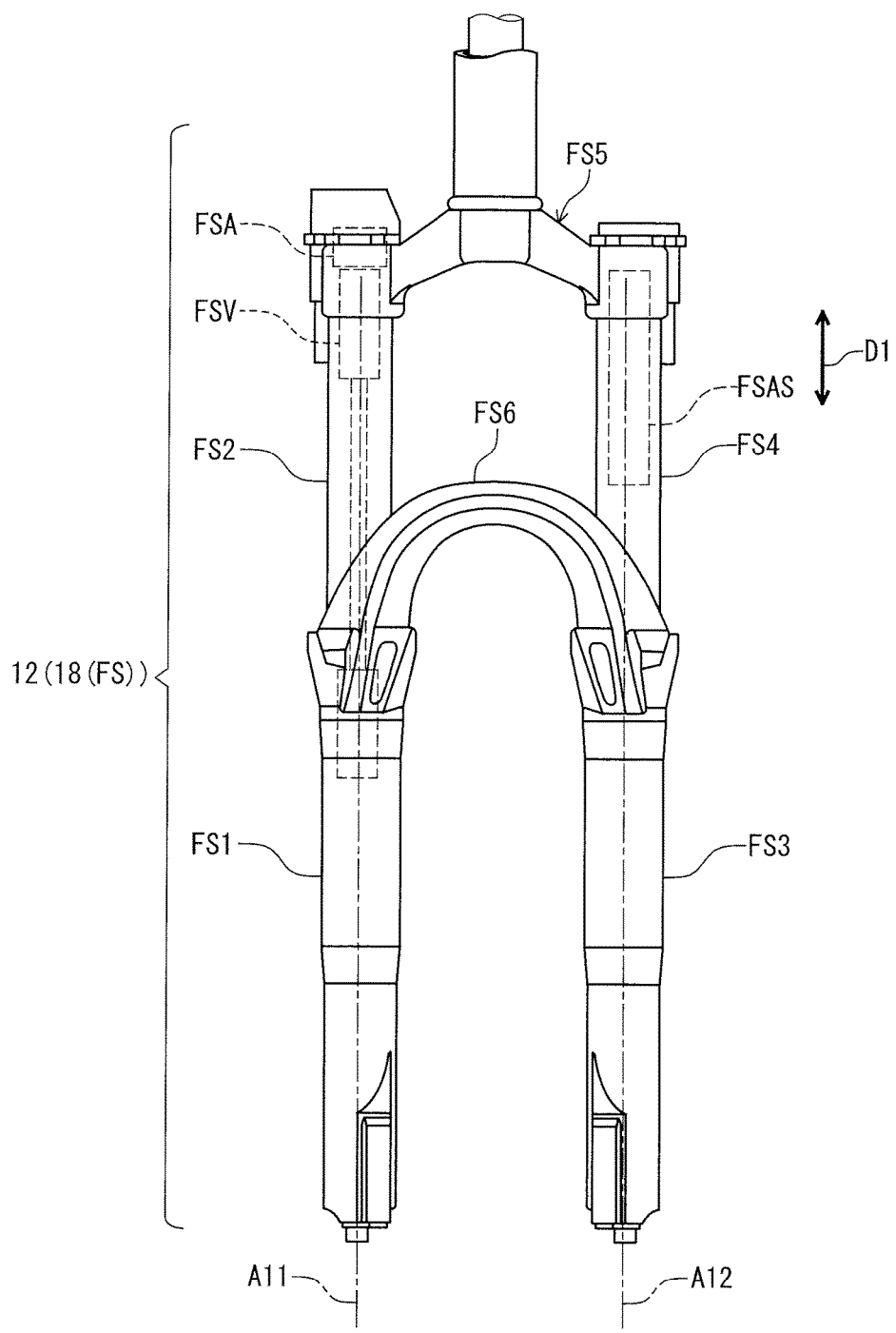
FIG. 4 is a front view of the bicycle electric component (an electric front suspension) illustrated in FIG. 1.

As seen in FIG. 4, the electric front suspension FS includes a first suspension tube FS1, a second suspension tube FS2, a valve structure FSV, and a first electric actuator FSA. The first suspension tube FS1 has a center axis A11. The second suspension tube FS2 is telescopically received in the first suspension tube FS1. The valve structure FSV is configured to change the damping characteristic of the electric front suspension FS. The first electric actuator FSA is coupled to the valve structure FSV to actuate the valve structure FSV. The first electric actuator FSA is mounted on an upper end of the second suspension tube FS2. However, the first electric actuator FSA can be provided at other positions.

In this embodiment, the electric front suspension FS has the unlocked state and the locked state. The valve structure FSV at least changes a state of the electric front suspension FS between the unlocked state and the locked state. In the locked state of the valve structure FSV, the first suspension tube FS1 is locked relative to the second suspension tube FS2 in the telescopic direction D1. However, the first suspension tube FS1 can be slightly moved in the locked state of the valve structure FSV, when a large shock from terrain is applied to the electric front suspension FS. For example, a fluid passageway (not shown) of the valve structure FSV is closed by a valve (not shown) of the valve structure FSV in the locked state. In the unlocked state of the valve structure FSV, the first suspension tube FS1 and the second suspension tube FS2 are movable relative to each other in the telescopic direction D1 to absorb shocks from rough terrain. For example, the fluid passageway (not shown) of the valve structure FSV is released by the valve (not shown) of the valve structure FSV in the unlocked state. The first electric actuator FSA is operatively coupled to the valve structure FSV to change a state of the valve structure FSV between the unlocked state and the locked state. Valve structures for bicycle suspensions are well known in the bicycle field. Thus, the valve structure FSV can be any type of suitable lockout device as needed and/or desired.

The electric front suspension FS can have an intermediate state between the unlocked state and the locked state. For example, a cross section of the fluid passageway (not shown) at the valve (not shown) in the intermediate state is smaller than a cross section of the fluid passageway (not shown) at the valve (not shown) in the unlocked state.

Similarly, the electric front suspension FS comprises a third suspension tube FS3, a fourth suspension tube FS4, and a stroke adjustment structure FSAS. The third suspension tube FS3 has a center axis A12. The fourth suspension tube FS4 is telescopically received in the third suspension tube FS3.

In this embodiment, the stroke adjustment structure FSAS is configured to change a stroke of the electric front suspension FS. The stroke adjustment structure FSAS is configured to change a relative position of the third suspension tube FS3 and the fourth suspension tube FS4 between a long-stroke position and a short-stroke position in the telescopic direction D1. The stroke adjustment structure FSAS is manually operated by the user to change the resistance. Stroke adjustment devices for bicycle suspensions are well known in the bicycle field. Thus, the stroke adjustment structure FSAS can be any type of suitable stroke adjustment device as needed and/or desired.

The second and fourth suspension tubes FS2 and FS4 are coupled to a crown FS5. The first suspension tube FS1 is coupled to the third suspension tube FS3 with a coupling arm FS6. The first and third suspension tubes FS1 and FS3 are integrally movable relative to the second and fourth suspension tubes FS2 and FS4 to absorb shocks. In the unlocked state of the valve structure FSV, the first suspension tube FS1 and the third suspension tube FS3 are respectively movable relative to the second suspension tube FS2 and the fourth suspension tube FS4 in the telescopic direction D1 to absorb shocks from rough terrain.

As seen in FIG. 3, the suspension 18 (the electric front suspension FS) further includes a valve position sensor FSS. The valve position sensor FSS is configured to sense the state of the valve structure FSV with the first electric actuator FSA. In this embodiment, the valve position sensor FSS is a contact rotational position sensor such as a potentiometer. The valve position sensor FSS is configured to sense an absolute rotational position of the rotational shaft of the first electric actuator FSA as the state of the valve structure FSV. Other examples of the valve position sensor FSS include a non-contact rotational position sensor such as an optical sensor (e.g., a rotary encoder) and a magnetic sensor (e.g., a hall sensor).

The bicycle electric component 12 (the suspension 18 (the electric front suspension FS)) comprises a wireless communicator WC configured to receive a wireless signal WS12A, WS12B. In the following description, the wireless communicator WC of the electric front suspension FS is specifically referred to as a first wireless communicator WC1. The bicycle electric component 12 (the suspension 18 (the electric front suspension FS)) comprises a bicycle component controller CC. In the following description, the bicycle component controller CC of the electric front suspension FS is specifically referred to as a first bicycle component controller CC1. The first electric actuator FSA, the valve position sensor FSS, and the first wireless communicator WC1 are electrically connected to the first bicycle component controller CC1.

The first bicycle component controller CC1 is configured to control the first electric actuator FSA based on the unlock control signal WS12A and the lock control signal WS12B transmitted from the bicycle electric operating device 22 via the first wireless communicator WC1 as well as the position sensed by the valve position sensor FSS. Specifically, the first bicycle component controller CC1 is configured to control the first electric actuator FSA to open the fluid passageway of the valve structure FSV to change the state of the valve structure FSV to the unlocked state based on the sensed position and the unlock control signal WS12A. The first controller CR1 is configured to control the first electric actuator FSA to close the fluid passageway of the valve structure FSV to change the state of the valve structure FSV to the locked state based on the sensed position and the lock control signal WS12B.

As seen in FIG. 3, the first bicycle component controller CC1 is constituted as a microcomputer and includes a processor Pr3 and a memory Mo3. The processor Pr3 includes a CPU and a memory controller. The memory Mo3 includes a ROM and a RAM. The ROM includes a non-transitory computer-readable storage medium. The RAM includes a transitory computer-readable storage medium. The memory Mo3 includes storage areas each having an address in the ROM and the RAM. The processor Pr3 is configured to control the memory Mo3 to store data in the storage areas of the memory Mo3 and to read data from the storage areas of the memory Mo3.

At least one program is stored in the memory Mo3 (e.g., the ROM). The at least one program is read into the processor Pr3, and thereby functions of the first bicycle component controller CC1 are performed. The processor Pr3 and the memory Mo3 are mounted on a circuit board Bo3 and are connected to each other with the bus Bu1. The first bicycle component controller CC1 can also be referred to as a first bicycle component control circuit or circuitry CC1.

Further, the bicycle electric component 12 (the suspension 18 (the electric front suspension FS)) comprises a detector DT to detect an operational state of the bicycle 10. In the following description, the detector DT of the electric front suspension FS is specifically referred to as a first detector DT1. As seen in FIGS. 1 and 3, the detector DT includes at least one of a vibration sensor Sv1, Sv2, a pressure sensor Sp1, Sp2, Sp3, a rotation sensor Sr1, Sr2, Sr3, Sr4, a strain sensor Ss1, Ss2, and a bicycle lock-state sensor Sk. As seen in FIG. 3, the detector DT further includes an input interface IF through which an output signal from the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk is inputted via the wireless communicator WC or an electric cable connected to the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the first detector DT1 is specifically referred to as a first input interface IF1.

The vibration sensors Sv1 and Sv2 are typically acceleration sensors. For example, as seen in FIG. 1, the vibration sensors Sv1 and Sv2 are mounted to the electric front suspension FS and the rear swing arm B5, respectively. However, at least one of the vibration sensors Sv1 and Sv2 can be mounted to other positions than the electric front suspension FS and the rear swing arm B5 such as the third suspension tube FS3 and the bicycle body B. The vibration sensors Sv1 and Sv2 are configured to detect acceleration applied to the bicycle 10. Typically, the vibration sensor Sv1 is connected to the first input interface IF1 via the electric cable and is configured to output a signal including an amount of the acceleration to the first detector DT1 via the electric cable. The vibration sensor Sv2 is connected to a second wireless communicator WC2 (See FIG. 3) attached to the bicycle rear derailleur RD via an electric cable and is configured to output a signal including an amount of the acceleration to the detector DT (the first detector DT1) via wireless communication between the first wireless communicator WC1 and the second wireless communicator WC2. However, the vibration sensor Sv1 can output the signal to the first detector DT1 via wireless communication, and the vibration sensor Sv2 can output the signal to the detector DT (the first detector DT1) via wired communication.

The pressure sensor Sp1 is typically a strain gauge attached to a bicycle pedal PED. The pressure sensor Sp1 is configured to detect a strain amount in accordance with a pressure applied to the bicycle pedal PED. The pressure sensors Sp2 and Sp3 are typically film-shaped pressure sensors attached to the handlebar B2 and the saddle BC3, respectively. The pressure sensors Sp2 and Sp3 are configured to detect capacity changes in accordance with deformation of films of the pressure sensors Sp2 and Sp3 due to pressures applied to the handlebar B2 and the saddle BC3, respectively. However, the above description regarding the pressure sensors Sp1 to Sp3 is merely an example. The pressure sensors Sp1 to Sp3 may be different types of sensors to detect pressures applied to the bicycle pedal PED, the handlebar B2, and the saddle BC3, respectively. Typically, the pressure sensor Sp1 has a battery and a wireless transmitter to wirelessly transmit a signal including an amount of the pressure to the detector DT (the first detector DT1) via wireless communication between the wireless transmitter and the first wireless communicator WC1. The pressure sensor Sp2 is connected to at least one of the first operation wireless communicator OWC1 and the second operation wireless communicator OWC2 via an electric cable and is configured to output the signal to the detector DT (the first detector DT1) via wireless communication between the first wireless communicator WC1 and the at least one of the first operation wireless communicator OWC1 and the second operation wireless communicator OWC2. The pressure sensor Sp3 is electrically connected to a third wireless communicator WC3 (See FIG. 3) attached to the adjustable seatpost 16 and is configured to output a signal including an amount of the pressure to the detector DT (the first detector DT1) via wireless communication between the first wireless communicator WC1 and the third wireless communicator WC3. However, the pressure sensors Sp1 to Sp3 are connected to different wireless communicators. Alternatively, the pressure sensors Sp1 to Sp3 can output the signal to the detector DT (the first detector DT1) via wired communication.

Figure 5:
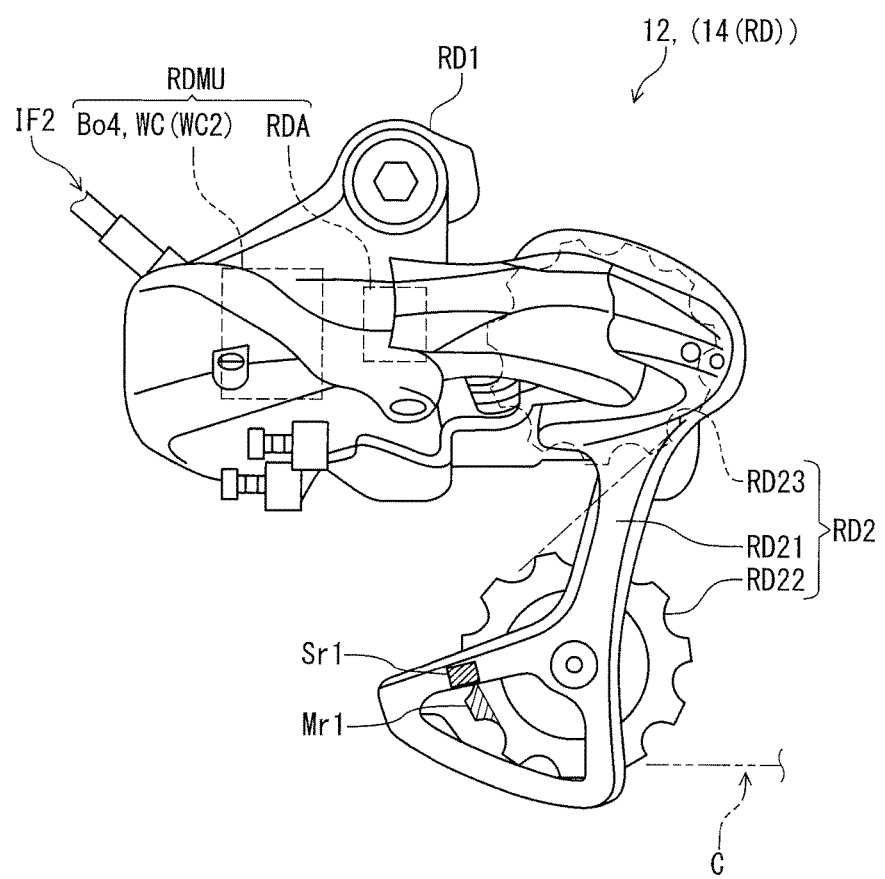
FIG. 5 is a side elevational view of the bicycle electric component (a rear derailleur) illustrated in FIG. 1.

The rotation sensors Sr1, Sr2, Sr3, and Sr4 are used with magnetized parts Mr1, Mr2, Mr3, and Mr4, respectively. For example, each of the magnetized parts Mr1, Mr2, Mr3, and Mr4 includes a permanent magnet. Each of the rotation sensors Sr1, Sr2, Sr3, and Sr4 includes a magnetic sensor. As shown in FIGS. 1 and 5, the magnetized part Mr1 is attached to a first pulley RD22, which is described below. The rotation sensor Sr1 is attached to a chain guide RD21, which will be described below. When the user pedals the bicycle 10, the first pulley RD22 rotates relative to the chain guide RD21. The magnetized part Ma passes through a sensing area of the rotation sensor Sr1 by each rotation of the first pulley RD22 so that the rotation sensor Sr1 senses the rotation of the first pulley RD22. The rotation sensor Sr1 is connected to the second wireless communicator WC2 attached to the bicycle rear derailleur RD via an electric cable and is configured to output a signal indicating the rotation to the detector DT (the first detector DT1) via wireless communication between the first wireless communicator WC1 and the second wireless communicator WC2. However, the rotation sensor Sr1 can be connected to a different wireless communicator from the second wireless communicator WC2. Alternatively, the rotation sensor Sr1 can output the signal to the detector DT (the first detector DT1) via wired communication.

As shown in FIG. 1, the magnetized part Mr2 is attached to a spoke of the rear wheel Wr. The rotation sensor Sr2 is attached to the rear swing arm B5. When the user pedals the bicycle 10, the rear wheel Wr rotates relative to the bicycle frame B1 (specifically, the rear swing arm B5). The magnetized part Mr2 passes through a sensing area of the rotation sensor Sr2 by each rotation of the rear wheel Wr so that the rotation sensor Sr2 senses the rotation of the rear wheel Wr. As shown in FIG. 1, the magnetized part Mr3 is attached to the bicycle chain C. The magnetized part Mr3 can be a magnetized link plate of the bicycle chain C. The rotation sensor Sr3 is attached to the bicycle frame B1 adjacent to an outer periphery of the front sprocket BC11. When the user pedals the bicycle 10, the bicycle chain C rotates relative to the bicycle frame B1. The magnetized part Mr3 passes through a sensing area of the rotation sensor Sr3 by each rotation of the bicycle chain C so that the rotation sensor Sr3 senses the rotation of the bicycle chain C. As shown in FIG. 1, the magnetized part Mr4 is attached to the crank assembly BC1. As shown in FIG. 1, the crank assembly BC1 includes crank arms CAR. The magnetized part Mr4 is attached to one of the crank arms CAR. The rotation sensor Sr4 is attached to bicycle frame B1. When the user pedals the bicycle 10, the crank assembly BC1 (specifically, the crank arms CAR) rotates relative to the bicycle frame B1. The magnetized part Mr4 passes through a sensing area of the rotation sensor Sr4 by each rotation of the crank arms CAR so that the rotation sensor Sr4 senses the rotation of the crank assembly BC1. Typically, the rotation sensors Sr2, Sr3, and Sr4 are connected to a fourth wireless communicator WC4 (See FIG. 3) attached to the auxiliary drive unit 20 and is configured to output a signal indicating the rotation to the detector DT (the first detector DT1) via wireless communication between the first wireless communicator WC1 and the fourth wireless communicator WC4. However, at least one of the rotation sensors Sr2, Sr3, and Sr4 are connected to a different wireless communicator. Alternatively, at least one of the rotation sensors Sr2, Sr3, and Sr4 can output the signal to the detector DT (the first detector DT1) via wired communication.

The strain sensor Ss1 is typically a strain gauge attached to the crank assembly BC1. As shown in FIG. 1, the crank assembly BC1 includes a crank axle CAX connected to crank arms CAR. The strain sensor Ss1 is configured to detect a twist of the crank axle CAX due to the user's pedaling. The strain sensor Ss2 is typically a strain gauge attached to the front sprocket BC11. The strain sensor Ss2 is configured to detect a distortion of the front sprocket BC11 due to the user's pedaling. Each of the strain sensors Ss1 and Ss2 has a battery and a wireless communicator to wirelessly transmit its output signal to the first wireless communicator WC1.

The bicycle lock-state sensor Sk is typically an electrical switch to transmit a signal when the bicycle is unlocked. For example, the bicycle lock-state sensor Sk is turned off when a latch passes through a space between the spokes of the rear wheel Wr, and the bicycle lock-state sensor Sk is turned on when the latch moves to an unlock position. Typically, the bicycle lock-state sensor Sk is connected to the fourth wireless communicator WC4 attached to the auxiliary drive unit 20 and is configured to output the signal indicating the position of the latch to the detector DT (the first detector DT1) via wireless communication between the first wireless communicator WC1 and the fourth wireless communicator WC4. However, the bicycle lock-state sensor Sk is connected to a different wireless communicator. Alternatively, the bicycle lock-state sensor Sk can output the signal to the detector DT (the first detector DT1) via wired communication.

In this embodiment, the detector DT is configured to detect the operational state of the bicycle 10 based on the signal from the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. For example, the detector DT is configured to determine the operational state of the bicycle 10 when the detector DT detects the acceleration indicated by the signal from the at least one vibration sensor Sv1, Sv2 is over a vibration threshold which is predetermined. The detector DT can be configured to determine the non-operational state of the bicycle 10 when the detector DT detects the acceleration has been below the vibration threshold for a threshold time (e.g. a sampling time). The detector DT is configured to determine the operational state of the bicycle 10 when the detector DT detects the pressure indicated by the signal from the at least one pressure sensor Sp1, Sp2, Sp3 is over a pressure threshold which is predetermined. The detector DT can be configured to determine the non-operational state of the bicycle 10 when the detector DT detects the pressure has been below the pressure threshold for the threshold time. The detector DT is configured to determine the operational state of the bicycle 10 when the detector DT detects the strain amount indicated by the signal from the at least one strain sensor Ss1, Ss2 is over a strain threshold which is predetermined. The detector DT can be configured to determine the non-operational state of the bicycle 10 when the detector DT detects the strain amount has been below the strain threshold for the threshold time. The detector DT is configured to determine the operational state of the bicycle 10 when the detector DT detects the signal from the at least one rotation sensor Sr1, Sr2, Sr3, Sr4, which indicates at least one rotation is detected by the at least one rotation sensor Sr1, Sr2, Sr3, Sr4. The detector DT can be configured to determine the non-operational state of the bicycle 10 when the detector DT has not detected the signal from the at least one rotation sensor Sr1, Sr2, Sr3, Sr4, which means at least one rotation has not been detected by the at least one rotation sensor Sr1, Sr2, Sr3, Sr4. The detector DT is configured to determine the operational state of the bicycle 10 when the detector DT detects the signal from the bicycle lock-state sensor Sk, which indicates the bicycle 10 is unlocked. The detector DT can be configured to determine the non-operational state of the bicycle 10 when the detector DT has not detected the signal from the bicycle lock-state sensor Sk.

As seen in FIG. 3, the first detector DT1 further includes a processor Pr4 and a memory Mo4. The processor Pr4 includes a CPU and a memory controller. The memory Mo4 includes a ROM and a RAM. The ROM includes a non-transitory computer-readable storage medium. The RAM includes a transitory computer-readable storage medium. The memory Mo4 includes storage areas each having an address in the ROM and the RAM. The processor Pr4 is configured to control the memory Mo4 to store data in the storage areas of the memory Mo4 and to read data from the storage areas of the memory Mo4.

At least one program is stored in the memory Mo4 (e.g., the ROM). The at least one program is read into the processor Pr4, and thereby functions of the first detector DT1 are performed. The processor Pr4 and the memory Mo4 are mounted on the circuit board Bo3 and are connected to each other with the bus Bu1. The processor Pr4 can be integrated into the processor Pr3, and the memory Mo4 can be integrated into the memory Mo3.

Further, the bicycle electric component (the suspension 18 (the electric front suspension FS)) comprises a power source PS configured to supply a first electric power to wireless communicator WC. In the following description, the power source PS of the electric front suspension FS is specifically referred to as a first power source PS1. The first power source PS1 is electrically connected to the first wireless communicator WC1, the first bicycle component controller CC1, the first detector DT1, the valve position sensor FSS, and the first electric actuator FSA. Accordingly, the first power source PS1 is configured to supply the first electric power to the first wireless communicator WC1. Further, the first power source PS1 is configured to supply the first electric power to the first bicycle component controller CC1, the first detector DT1, the valve position sensor FSS, and the first electric actuator FSA. The first power source PS1 can include a primary battery such as a lithium manganese dioxide battery and a secondary battery such as a lithium-ion secondary battery. In this embodiment, the first power source PS1 includes a primary button battery. The first electric actuator FSA, the valve position sensor FSS, the first wireless communicator WC1, the first bicycle component controller CC1, the first detector DT1, and the first power source PS1 constitute a suspension motor unit FSMU.

The electric rear suspension RS can have substantially the same feature as that of the electric front suspension FS. In such a case, the electric rear suspension RS can be configured to receive the unlock control signal WS12A and the lock control signal WS12B to perform the same control as the electric front suspension FS. Alternatively, the bicycle electric operating device 22 can transmit, to the electric rear suspension RS, different unlock and lock control signals from unlock control signal WS12A and the lock control signal WS12B, and the electric rear suspension RS can be configured to receive the different unlock and lock control signals to perform the same control as the electric front suspension FS.

Derailleur

As seen in FIG. 5, the bicycle rear derailleur RD includes a base member RD1, a movable member RD2, and a second electric actuator RDA. The second electric actuator RDA can also be referred to as a shifting electric actuator RDA. The movable member RD2 is movably coupled to the base member RD1. The movable member RD2 is movable relative to the base member RD1 to change a gear stage of the bicycle rear derailleur RD. The shifting electric actuator RDA is operatively coupled to the movable member RD2 to move the movable member RD2 relative to the base member RD1. The base member RD1 is attached to the bicycle body B (FIG. 1). The shifting electric actuator RDA is configured to move the movable member RD2 relative to the base member RD1 to shift the bicycle chain C relative to the rear sprocket assembly BC2. The shifting electric actuator RDA is provided in the base member RD1. However, the shifting electric actuator RDA can be provided at the movable member RD2 or other positions.

In this embodiment, the movable member RD2 includes the chain guide RD21, the first pulley RD22, and a second pulley RD23. The chain guide RD21 is movably coupled to the base member RD1. The first pulley RD22 is rotatably coupled to the chain guide RD21. The second pulley RD23 is rotatably coupled to the chain guide RD21. The bicycle chain C is engaged with the first pulley RD22 and the second pulley RD23.

The shifting electric actuator RDA is operatively coupled to the movable member RD2 (the chain guide RD21). In this embodiment, the shifting electric actuator RDA includes a direct-current (DC) motor having a rotational shaft mechanically coupled to the movable member RD2. Other examples of the shifting electric actuator RDA include a stepper motor and an alternating-current (AC) motor.

As seen in FIG. 3, the derailleur 14 (the bicycle rear derailleur RD) further includes a shift position sensor RDS. The bicycle rear derailleur RD has a plurality of available shift positions. In this embodiment, the bicycle rear derailleur RD has twelve available shift positions respectively corresponding to the first to twelfth rear sprockets R1 to R12 (FIG. 1).

The shift position sensor RDS is configured to sense a position of the shifting electric actuator RDA as the shift position of the bicycle rear derailleur RD. In this embodiment, the shift position sensor RDS is a contact rotational position sensor such as a potentiometer. The shift position sensor RDS is configured to sense an absolute rotational position of the rotational shaft of the shifting electric actuator RDA as the shift position of the bicycle rear derailleur RD. Other examples of the shift position sensor RDS include a non-contact rotational position sensor such as an optical sensor (e.g., a rotary encoder) and a magnetic sensor (e.g., a hall sensor).

The bicycle electric component 12 (the derailleur 14 (the bicycle rear derailleur RD)) comprises a wireless communicator WC configured to receive a wireless signal WS11, WS21. In the following description, the wireless communicator WC of the derailleur 14 (the bicycle rear derailleur RD) is specifically referred to as a second wireless communicator WC2. The bicycle electric component 12 (the derailleur 14 (the bicycle rear derailleur RD)) comprises the bicycle component controller CC. In the following description, the bicycle component controller CC of the derailleur 14 is specifically referred to as a second bicycle component controller CC2. The shifting electric actuator RDA, the shift position sensor RDS, and the second wireless communicator WC2 are electrically connected to the second bicycle component controller CC2.

The second bicycle component controller CC2 is configured to control the shifting electric actuator RDA based on upshift and downshift control signals WS11 and WS21 and the shift position sensed by the shift position sensor RDS. Specifically, the second bicycle component controller CC2 is configured to control a rotational direction and a rotational speed of the rotational shaft based on the shift position and each of upshift and downshift control signals WS11 and WS21. The second bicycle component controller CC2 is configured to control the shifting electric actuator RDA to move the movable member RD2 relative to the base member RD1 in an upshifting direction in response to the upshift control signal WS11. The second bicycle component controller CC2 is configured to control the shifting electric actuator RDA to move the movable member RD2 relative to the base member RD1 in a downshifting direction in response to the downshift control signal WS21.

Furthermore, the second bicycle component controller CC2 is configured to stop rotation of the rotational shaft to position the chain guide RD21 at one of the low to top gear positions based on the shift position and each of the upshift and downshift control signals WS11 and WS21. The shift position sensor RDS transmits a current shift position to the second bicycle component controller CC2. The second bicycle component controller CC2 stores the shift position transmitted from the shift position sensor RDS as a latest rear shift position.

The second bicycle component controller CC2 is constituted as a microcomputer and includes a processor Pr5 and a memory Mo5. The processor Pr5 includes a CPU and a memory controller. The memory Mo5 includes a ROM and a RAM. The ROM includes a non-transitory computer-readable storage medium. The RAM includes a transitory computer-readable storage medium. The memory Mo5 includes storage areas each having an address in the ROM and the RAM. The processor Pr5 controls the memory Mo5 to store data in the storage areas of the memory Mo5 and reads data from the storage areas of the memory Mo5.

At least one program is stored in the memory Mo5 (e.g., the ROM). The at least one program is read into the processor Pr5, and thereby functions of the second bicycle component controller CC2 are performed. In addition, the latest rear shift position is stored in the memory Mo5 (e.g., the RAM) to be read by the at least one program. The processor Pr5 and the memory Mo5 are mounted on a circuit board Bo4 and are connected to each other with a bus Bu2. The second bicycle component controller CC2 can also be referred to as a second bicycle component control circuit or circuitry CC2.

Further, the bicycle electric component 12 (the derailleur 14 (the bicycle rear derailleur RD)) comprises the detector DT to detect the operational state of the bicycle 10. In the following description, the detector DT of the bicycle rear derailleur RD is specifically referred to as a second detector DT2. The second detector DT2 has substantially the same structure as the first detector DT1 except communication methods (wired or wireless communication) between the second detector DT2 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the second detector DT2 further includes the input interface IF which has substantially the same function as the first input interface IF1 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the second detector DT2 is specifically referred to as a second input interface IF2. For example, the vibration sensor Sv2 and the rotation sensor Sr1 are connected to the second input interface IF2 via the electric cables and are configured to output their signals via the electric cable. However, the other vibration sensor Sv1, the other rotation sensors Sr2, Sr3, and Sr4, the pressure sensors Sp1, Sp2, and Sp3, the strain sensors Ss1 and Ss2, and the bicycle lock-state sensor Sk are configured to output their signals via wireless communication between the second wireless communicator WC2 and another wireless communicator OWC1, OWC2, WC1, WC3, WC4, etc.

As seen in FIG. 3, the second detector DT2 further includes a processor Pr6 and a memory Mo6. The processor Pr6 includes a CPU and a memory controller. The memory Mo6 includes a ROM and a RAM. The ROM includes a non-transitory computer-readable storage medium. The RAM includes a transitory computer-readable storage medium. The memory Mo6 includes storage areas each having an address in the ROM and the RAM. The processor Pr6 is configured to control the memory Mo6 to store data in the storage areas of the memory Mo6 and to read data from the storage areas of the memory Mo6.

At least one program is stored in the memory Mo6 (e.g., the ROM). The at least one program is read into the processor Pr6, and thereby functions of the second detector DT2 are performed. The processor Pr6 and the memory Mo6 are mounted on the circuit board Bo4 and are connected to each other with the bus Bu2. The processor Pr6 can be integrated into the processor Pry, and the memory Mo6 can be integrated into the memory Mo5.

Further, the bicycle electric component (the derailleur 14 (the bicycle rear derailleur RD)) comprises a power source PS configured to supply a first electric power to wireless communicator WC. In the following description, the power source PS of the derailleur 14 (the bicycle rear derailleur RD) is specifically referred to as a second power source PS2. The second power source PS2 is electrically connected to the second wireless communicator WC2, the second bicycle component controller CC2, the second detector DT2, the shift position sensor RDS, and the shifting electric actuator RDA. Accordingly, the second power source PS2 is configured to supply the first electric power to the second wireless communicator WC2. Further, the second power source PS2 is configured to supply the first electric power to the second bicycle component controller CC2, the second detector DT2, the shift position sensor RDS, and the shifting electric actuator RDA. The second power source PS2 can include a primary battery such as a lithium manganese dioxide battery and a secondary battery such as a lithium-ion secondary battery. In this embodiment, the second power source PS2 includes a primary button battery. The shifting electric actuator RDA, the shift position sensor RDS, the second bicycle component controller CC2, the second detector DT2, and the second power source PS2 constitute a derailleur motor unit RDMU.

Adjustable Seatpost

Figure 6:
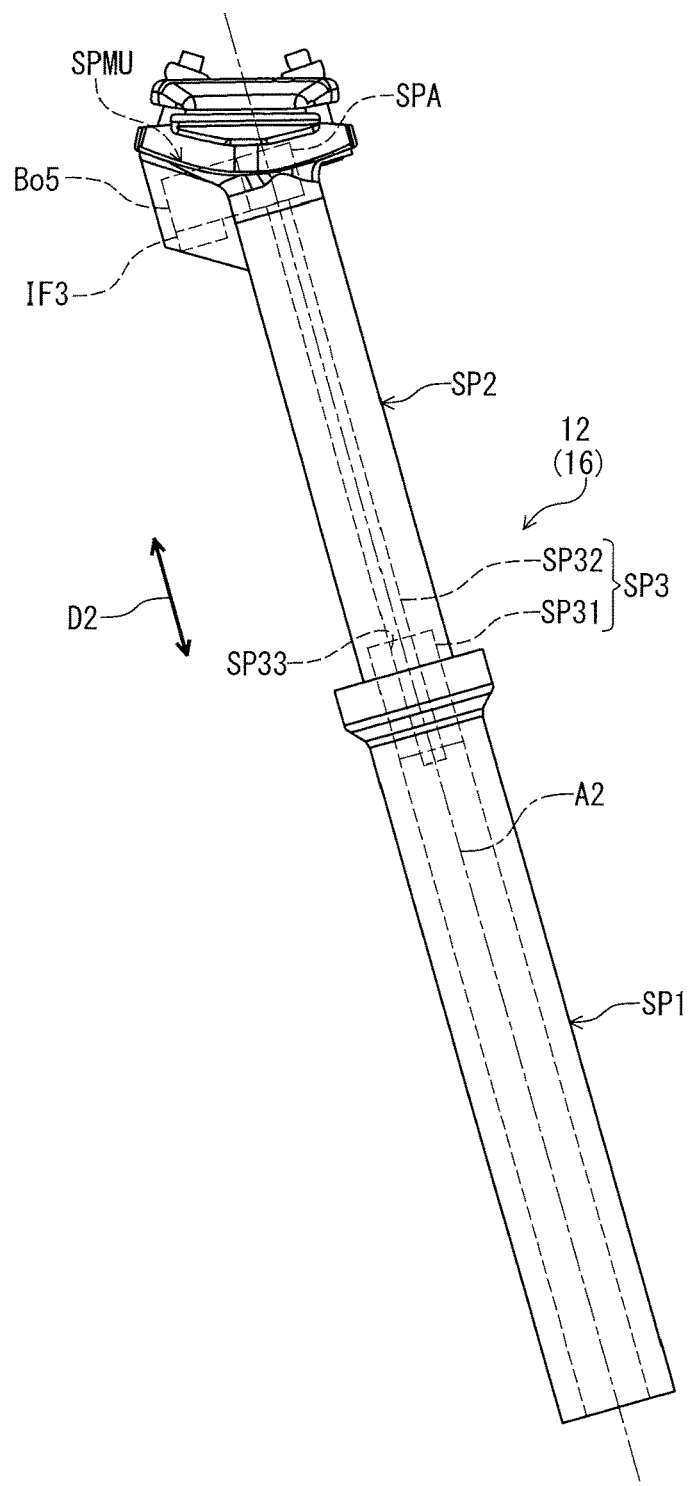
FIG. 6 is a side elevational view of the bicycle electric component (an adjustable seatpost) illustrated in FIG. 1.

As seen in FIG. 6, the adjustable seatpost 16 includes a first tube SP1, a second tube SP2, a positioning structure SP3, and a third electric actuator SPA. The third electric actuator SPA can also be referred to as a seatpost electric actuator SPA. The adjustable seatpost 16 has the positioning state and the adjustable state. In the positioning state, the first tube SP1 and the second tube SP2 are fixedly positioned relative to each other in a telescopic direction D2 to maintain an overall length of the adjustable seatpost 16. In the adjustable state, the first tube SP1 and the second tube SP2 are relatively movable relative to each other in the telescopic direction D2 to change the overall length.

The first tube SP1 has a center axis A2. The first tube SP1 is secured to the bicycle body B (FIG. 1). The second tube SP2 is telescopically received in the first tube SP1. The positioning structure SP3 is configured to relatively position the first tube SP1 and the second tube SP2 in the telescopic direction D2 parallel to the center axis A2 of the first tube SP1. The seatpost electric actuator SPA is configured to actuate the positioning structure SP3. The seatpost electric actuator SPA is coupled to the positioning structure SP3 to actuate the positioning structure SP3. In this embodiment, the seatpost electric actuator SPA is mounted on an upper end of the second tube SP2. However, the seatpost electric actuator SPA can be provided at other positions in the adjustable seatpost 16. For example, the seatpost electric actuator SPA can be provided at a lower end of an interior of the first tube SP1 or an upper end of the first tube SP1.

The positioning structure SP3 includes a guide SP31 and a screw rod SP32. The guide SP31 is secured to the first tube SP1 and extends in the first tube SP1. The guide SP31 includes a threaded hole SP33. The screw rod SP32 is threadedly engaged with the threaded hole SP33. The seatpost electric actuator SPA is coupled to the screw rod SP32 to rotate the screw rod SP32 relative to the second tube SP2. Rotation of the screw rod SP32 moves the second tube SP2 relative to the first tube SP1 in the telescopic direction D2.

As seen in FIG. 3, the adjustable seatpost 16 includes a seatpost position sensor SPS. The seatpost position sensor SPS is configured to sense a rotational position of the screw rod SP32. In this embodiment, the seatpost position sensor SPS is a contact rotational position sensor such as a potentiometer. The seatpost position sensor SPS is configured to sense an absolute rotational position of the rotational shaft of the seatpost electric actuator SPA. Other examples of the seatpost position sensor SPS include a non-contact rotational position sensor such as an optical sensor (e.g., a rotary encoder) and a magnetic sensor (e.g., a hall sensor).

The bicycle electric component 12 (the adjustable seatpost 16) comprises a wireless communicator WC configured to receive a wireless signal WS22A, WS22B. In the following description, the wireless communicator WC of the adjustable seatpost 16 is specifically referred to as a third wireless communicator WC3. The bicycle electric component 12 (the adjustable seatpost 16) comprises a bicycle component controller CC. In the following description, the bicycle component controller CC of the adjustable seatpost 16 is specifically referred to as a third bicycle component controller CC3. The seatpost position sensor SPS, the seatpost electric actuator SPA, and the third wireless communicator WC3 are electrically connected to the third bicycle component controller CC3.

The third bicycle component controller CC3 is configured to control the seatpost electric actuator SPA based on the first or second seatpost control signal WS22A or WS22B and the position sensed by the seatpost position sensor SPS. Specifically, the third bicycle component controller CC3 is configured to control a rotational direction of the rotational shaft based on the rotational position and the first or second seatpost control signal WS22A or WS22B. The third bicycle component controller CC3 is configured to control the seatpost electric actuator SPA to stop rotating the rotational shaft when the overall length of the adjustable seatpost 16 reaches the maximum length or the minimum length regardless of the first and second seatpost control signals WS22A and WS22B.

The third bicycle component controller CC3 is configured to control the seatpost electric actuator SPA based on the first and second seatpost control signals WS22A and WS22B to move the second tube SP2 relative to the first tube SP1 in the telescopic direction D2. The third bicycle component controller CC3 is configured to control the seatpost electric actuator SPA to move the second tube SP2 for shortening the adjustable seatpost 16 in response to the first seatpost control signal WS22A. The seatpost actuator driver SP7 controls the seatpost electric actuator SPA to move the second tube SP2 for lengthening the adjustable seatpost 16 in response to the second seatpost control signal WS22B.

The third bicycle component controller CC3 is constituted as a microcomputer and includes a processor Pr7 and a memory Mo7. The processor Pr7 includes a CPU and a memory controller. The memory Mo7 includes a ROM and a RAM. The ROM includes a non-transitory computer-readable storage medium. The RAM includes a transitory computer-readable storage medium. The memory Mo7 includes storage areas each having an address in the ROM and the RAM. The processor Pr7 controls the memory Mo7 to store data in the storage areas of the memory Mo7 and reads data from the storage areas of the memory Mo7.

At least one program is stored in the memory Mo7 (e.g., the ROM). The at least one program is read into the processor Pr7, and thereby functions of the third bicycle component controller CC3 are performed. In addition, the maximum length and the minimum length are stored in the memory Mo7 (e.g., the RAM) to be read by the at least one program. The processor Pr7 and the memory Mo7 are mounted on a circuit board Bo5 and are connected to each other with a bus Bu3. The third bicycle component controller CC3 can also be referred to as a third bicycle component control circuit or circuitry CC3.

Further, the bicycle electric component 12 (the adjustable seatpost 16) comprises the detector DT to detect the operational state of the bicycle 10. In the following description, the detector DT of the adjustable seatpost 16 is specifically referred to as a third detector DT3. The third detector DT3 has substantially the same structure as the first detector DT1 and the second detector DT2 except communication methods (wired or wireless communication) between the third detector DT3 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the third detector DT3 further includes the input interface IF which has substantially the same function as the first input interface IF1 and the second input interface IF2 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the third detector DT3 is specifically referred to as a third input interface IF3. For example, the pressure sensor Sp3 is connected to the third input interface IF3 via the electric cables and are configured to output their signals via the electric cable. However, the vibration sensors Sv1, Sv2, the rotation sensors Sr1, Sr2, Sr3, and Sr4, the other pressure sensors Sp1 and Sp2, the strain sensors Ss1 and Ss2, and the bicycle lock-state sensor Sk are configured to output their signals via wireless communication between the third wireless communicator WC3 and another wireless communicator OWC1, OWC2, WC1, WC2, WC4, etc.

As seen in FIG. 3, the third detector DT3 further includes a processor Pr8 and a memory Mo8. The processor Pr8 includes a CPU and a memory controller. The memory Mo8 includes a ROM and a RAM. The ROM includes a non-transitory computer-readable storage medium. The RAM includes a transitory computer-readable storage medium. The memory Mo8 includes storage areas each having an address in the ROM and the RAM. The processor Pr8 is configured to control the memory Mo8 to store data in the storage areas of the memory Mo8 and to read data from the storage areas of the memory Mo8.

At least one program is stored in the memory Mo8 (e.g., the ROM). The at least one program is read into the processor Pr8, and thereby functions of the third detector DT3 are performed. The processor Pr8 and the memory Mo8 are mounted on the circuit board Bo5 and are connected to each other with the bus Bu3. The processor Pr8 can be integrated into the processor Pr7, and the memory Mo8 can be integrated into the memory Mo1.

Further, the bicycle electric component (the adjustable seatpost 16) comprises a power source PS configured to supply a first electric power to wireless communicator WC. In the following description, the power source PS of the adjustable seatpost 16 is specifically referred to as a third power source PS3. The third power source PS3 is electrically connected to the third wireless communicator WC3, the third bicycle component controller CC3, the third detector DT3, the seatpost position sensor SPS, and the seatpost electric actuator SPA. Accordingly, the third power source PS3 is configured to supply the first electric power to the third wireless communicator WC3. Further, the third power source PS3 is configured to supply the first electric power to the third bicycle component controller CC3, the third detector DT3, the seatpost position sensor SPS, and the seatpost electric actuator SPA. The third power source PS3 can include a primary battery such as a lithium manganese dioxide battery and a secondary battery such as a lithium-ion secondary battery. In this embodiment, the third power source PS3 includes a primary button battery. The seatpost electric actuator SPA, the seatpost position sensor SPS, the third bicycle component controller CC3, the third detector DT3, and the third power source PS3 constitute a seatpost motor unit SPMU.

Auxiliary Drive Unit

As seen in FIG. 3, the auxiliary drive unit 20 includes an assist motor AM and a torque sensor TS. The assist motor AM is configured to generate the auxiliary drive force. The assist motor AM is coupled to the crank assembly BC1 to transmit the auxiliary drive force. The torque sensor TS is configured to sense an input torque applied to the crank assembly BC1 from the rider during pedaling. The torque sensor TS is attached to the crank assembly BC1. The torque sensor TS can include the strain gauge Ss1.

Further, the bicycle electric component 12 (the auxiliary drive unit 20) comprises a wireless communicator WC configured to receive a wireless signal WS13A, WS13B, WS13C. In the following description, the wireless communicator WC of the auxiliary drive unit 20 is specifically referred to as a fourth wireless communicator WC4. The bicycle electric component 12 (the auxiliary drive unit 20) comprises a bicycle component controller CC. In the following description, the bicycle component controller CC of the auxiliary drive unit 20 is specifically referred to as a fourth bicycle component controller CC4. The torque sensor TS, the assist motor AM, and the fourth wireless communicator WC4 are electrically connected to the fourth bicycle component controller CC4.

The auxiliary drive unit 20 has a first assist mode, a second assist mode, and a third assist mode. The first assist mode has a first assist ratio. The second assist mode has a second assist ratio. The third assist mode has a third assist ratio. In this embodiment, the first assist ratio is the highest among the first to third assist ratios. The third assist ratio is the lowest among the first to third assist ratios.

In the first assist mode, the fourth bicycle component controller CC4 is configured to control the assist motor AM to generate the auxiliary drive force in accordance with the first assist ratio and the input torque sensed by the torque sensor TS. More specifically, in the first assist mode, the fourth bicycle component controller CC4 is configured to control the assist motor AM to generate the auxiliary drive force having a torque obtained by multiplying the input torque by the first assist ratio. In the second assist mode, the fourth bicycle component controller CC4 is configured to control the assist motor AM to generate the auxiliary drive force having a torque obtained by multiplying the input torque by the second assist ratio. In the third assist mode, the fourth bicycle component controller CC4 is configured to control the assist motor AM to generate the auxiliary drive force having a torque obtained by multiplying the input torque by the third assist ratio.

The auxiliary drive unit 20 is configured to change an assist mode among the first to third assist modes in response to the first-mode to third-mode control signals WS13A to WS13C. The auxiliary drive unit 20 is configured to change the assist mode to the first assist mode in response to the first-mode control signal WS13A. The auxiliary drive unit 20 is configured to change the assist mode to the second assist mode in response to the second-mode control signal WS13B. The auxiliary drive unit 20 is configured to change the assist mode to the third assist mode in response to the third-mode control signal WS13C.

As seen in FIG. 3, the fourth bicycle component controller CC4 is constituted as a microcomputer and includes a processor Pr9 and a memory Mo9. The processor Pr9 includes a CPU and a memory controller. The memory Mo9 includes a ROM and a RAM. The ROM includes a non-transitory computer-readable storage medium. The RAM includes a transitory computer-readable storage medium. The memory Mo9 includes storage areas each having an address in the ROM and the RAM. The processor Pr9 is configured to control the memory Mo9 to store data in the storage areas of the memory Mo9 and to read data from the storage areas of the memory Mo9.

At least one program is stored in the memory Mo9 (e.g., the ROM). In addition, the memory Mo9 (e.g. the ROM) stores the first to third assist ratios. The at least one program is read into the processor Pr9, and thereby functions of the fourth bicycle component controller CC4 are performed. The processor Pr9 and the memory Mo9 are mounted on a circuit board Bo6 and are connected to each other with the bus Bu4. The fourth bicycle component controller CC4 can also be referred to as a fourth bicycle component control circuit or circuitry CC4.

Further, the bicycle electric component 12 (the auxiliary drive unit 20) comprises the detector DT to detect the operational state of the bicycle 10. In the following description, the detector DT of the auxiliary drive unit 20 is specifically referred to as a fourth detector DT4. The fourth detector DT4 has substantially the same structure as the first to third detectors DT1 to DT3 except communication methods (wired or wireless communication) between the fourth detector DT4 and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk.

As seen in FIG. 3, the fourth detector DT4 further includes the input interface IF which has substantially the same function as the first to third input interfaces IF1 to IF3 except the communication methods (wired or wireless communication) between the input interface IF and the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk. In the following description, the input interface IF of the fourth detector DT4 is specifically referred to as a fourth input interface IF4. For example, the rotation sensors Sr2, Sr3, and Sr4 and the bicycle lock-state sensor Sk are connected to the fourth input interface IF4 via the electric cables and are configured to output their signals via the electric cable. However, the vibration sensor Sv1, Sv2, and the other rotation sensor Sr1, the pressure sensors Sp1, Sp2, and Sp3, and the strain sensors Ss1 and Ss2 are configured to output their signals via wireless communication between the fourth wireless communicator WC4 and another wireless communicator OWC1, OWC2, WC1, WC3, WC4, etc.

As seen in FIG. 3, the fourth detector DT4 further includes a processor Pr10 and a memory Mo10. The processor Pr10 includes a CPU and a memory controller. The memory Mo10 includes a ROM and a RAM. The ROM includes a non-transitory computer-readable storage medium. The RAM includes a transitory computer-readable storage medium. The memory Mo10 includes storage areas each having an address in the ROM and the RAM. The processor Pr10 is configured to control the memory Mo10 to store data in the storage areas of the memory Mo10 and to read data from the storage areas of the memory Mo10.

At least one program is stored in the memory Mo10 (e.g., the ROM). The at least one program is read into the processor Pr10, and thereby functions of the fourth detector DT4 are performed. The processor Pr10 and the memory Mo10 are mounted on the circuit board Bo6 and are connected to each other with the bus Bu4. The processor Pr10 can be integrated into the processor Pr9, and the memory Mo10 can be integrated into the memory Mo9.

Further, the bicycle electric component (the auxiliary drive unit 20) comprises a power source PS configured to supply a first electric power to wireless communicator WC. In the following description, the power source PS of the auxiliary drive unit 20 is specifically referred to as a fourth power source PS4. The fourth power source PS4 is electrically connected to the fourth wireless communicator WC4, the fourth bicycle component controller CC4, the fourth detector DT4, the torque sensor TS, and the assist motor AM. Accordingly, the fourth power source PS4 is configured to supply the first electric power to the fourth wireless communicator WC4. Further, the fourth power source PS4 is configured to supply the first electric power to the fourth bicycle component controller CC4, the fourth detector DT4, the torque sensor TS, and the assist motor AM. The fourth power source PS4 can include a large capacity lithium-ion battery. As seen in FIG. 1, the fourth power source PS4 is mounted to the bicycle body B. As seen in FIG. 2, the fourth power source PS4 is detachably attached to the battery holder BH. The fourth wireless communicator WC4 and the fourth bicycle component controller CC4 can be provided in the battery holder BH.

Bicycle Electric Component Features

In this description, the wireless communicator WC (at least one of WC1, WC2, WC3, and WC4) has a first operating mode and a second operating mode. A power consumption of the second operating mode is lower than a power consumption of the first operating mode. For example, the bicycle component controller CC (at least one of CC1 to CC4) is activated in the first operating mode, and the bicycle component controller CC is deactivated in the second operating mode. Alternatively, a reception frequency of the wireless communicator WC in the second operating mode is less than that in the first operating mode, which is described in detail in another embodiment, for example.

Figure 7:
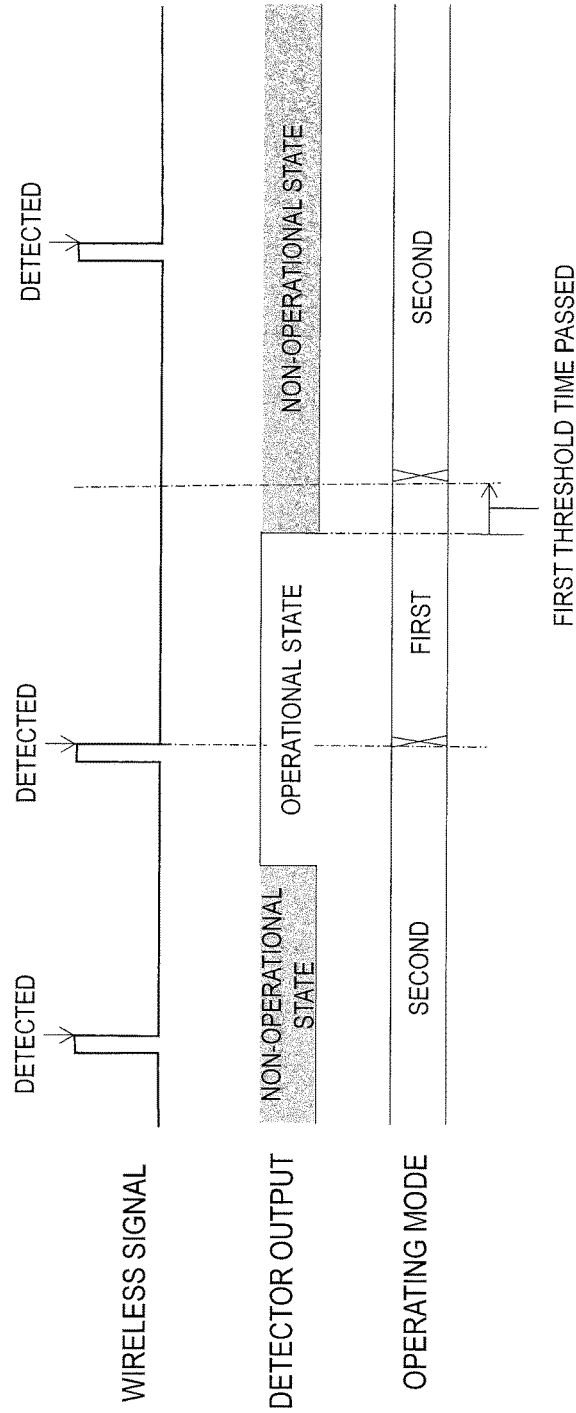
FIG. 7 is a timing chart of a first operating mode and a second operating mode of the bicycle electric component illustrated in FIGS. 1 and 3.

As seen in FIG. 7, the wireless communicator WC is configured to change from the second operating mode to the first operating mode in a state where the wireless communicator WC receives the wireless signal and the detector DT (at least one of DT1 to DT4) detects the operational state of the bicycle 10. The bicycle component controller CC is configured to change from the first operating mode to the second operating mode in a state where the detector DT has not detected the operational state of the bicycle 10 for a first threshold time period.

Figure 8:
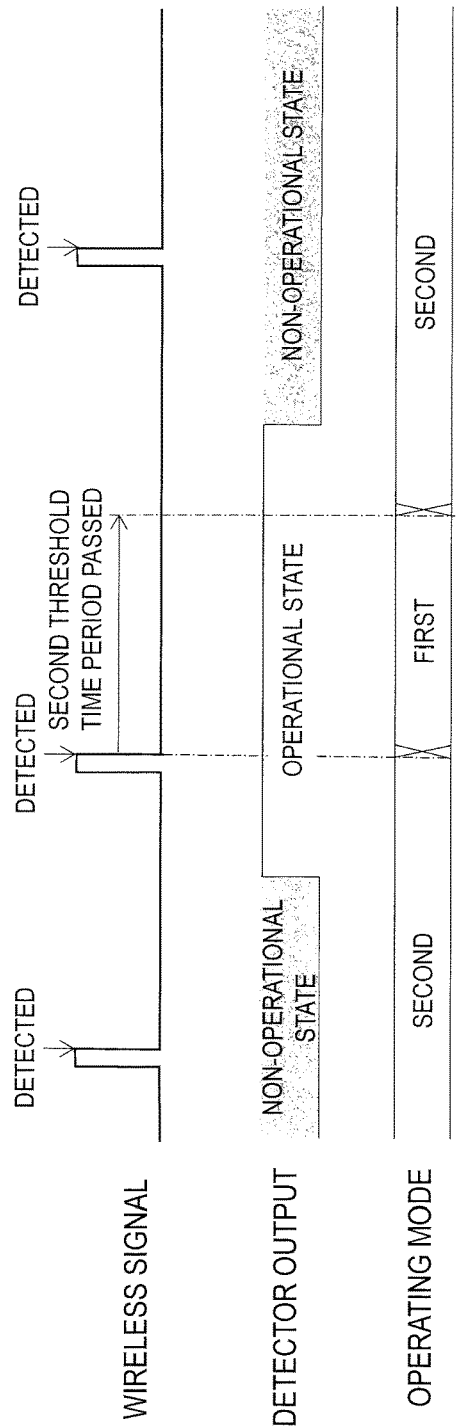
FIG. 8 is another timing chart of a first operating mode and a second operating mode of the bicycle electric component illustrated in FIGS. 1 and 3.

Alternatively and additionally, as seen in FIG. 8, the bicycle component controller CC is configured to change from the first operating mode to the second operating mode in a state where the wireless communicator WC has not received the wireless signal for a second threshold time period.

The bicycle electric component 12 has the following features.

Since the wireless communicator WC has the first operating mode and the second operating mode in which the power consumption is lower than that in the first operating mode and the wireless communicator WC is configured to change from the second operating mode to the first operating mode in the state where the wireless communicator WC receives the wireless signal and the detector DT detects the operational state of the bicycle 10, it is possible to reduce power consumption when the bicycle is not operated.

Second Embodiment

A bicycle electric component 112 provided in accordance with a second embodiment will be described below referring to FIG. 9. The bicycle electric component 112 has the same structure and/or configuration as those of the bicycle electric component 12 except that the bicycle electric component 112 comprises a switcher PSW in place of the detector DT in the bicycle electric component 12. Thus, elements having substantially the same function as those in the first embodiment will be numbered the same here, and will not be described and/or illustrated again in detail here for the sake of brevity.

Figure 9:
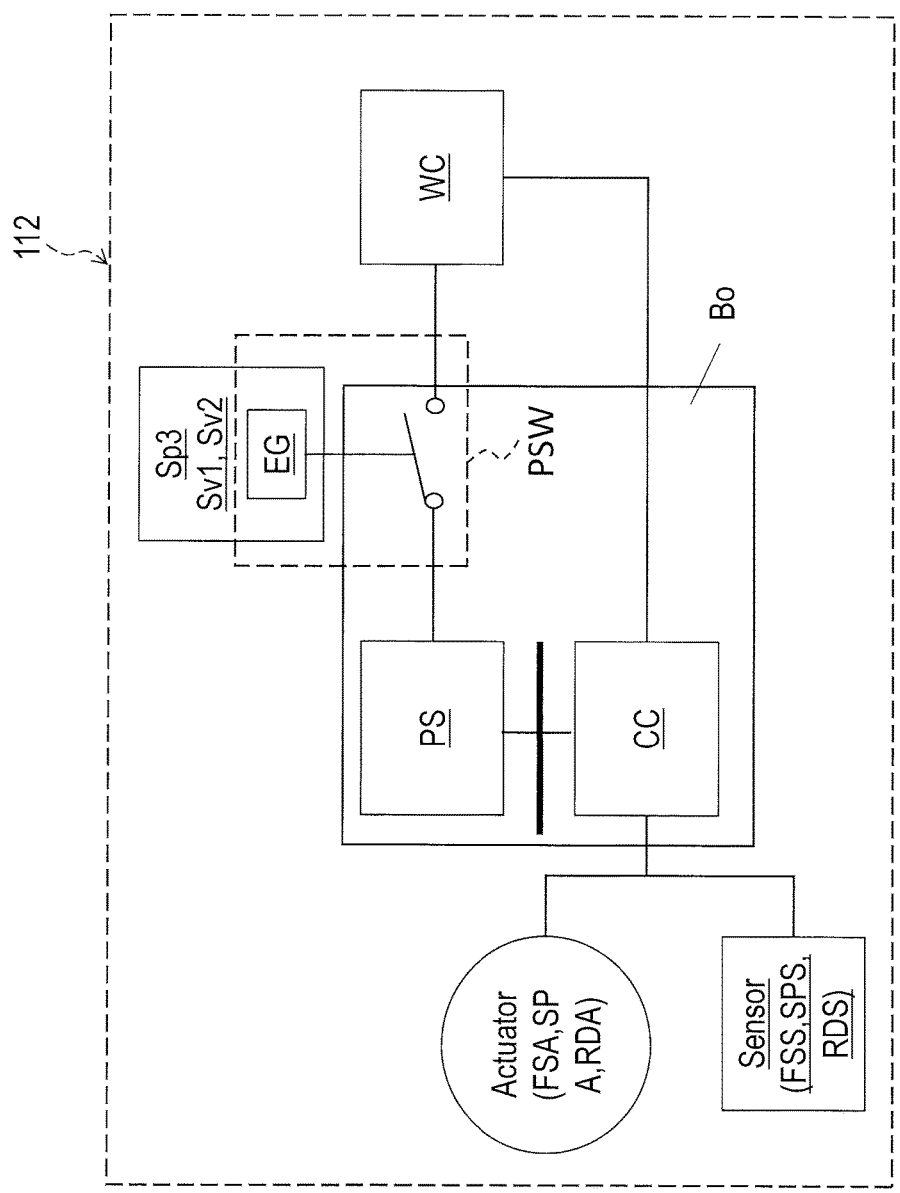
FIG. 9 is a schematic block diagram of a bicycle electric component in accordance with a second embodiment.

As seen in FIG. 9, the bicycle electric component 112 comprises the wireless communicator, the power source, and a switcher PSW. Preferably, the switcher PSW is provided on a board Bo (at least one of Bo3 to Bo6). The switcher PSW is configured to change an electric connection state between the wireless communicator WC and the power source PS (at least one of PS1 to PS4). The switcher PSW includes an electric generator EG configured to generate a second electric power by an external input to the bicycle 10. For example, the electric generator EG is provided in the pressure sensor Sp3, or the vibration sensor Sv1, Sv2. The electric generator EG includes a piezoelectric power generating element to generate the second electric power due to deformation or vibration of the piezoelectric power generating element when the bicycle 10 is operated. That is, the external input includes an operation of the bicycle.

Figure 10:
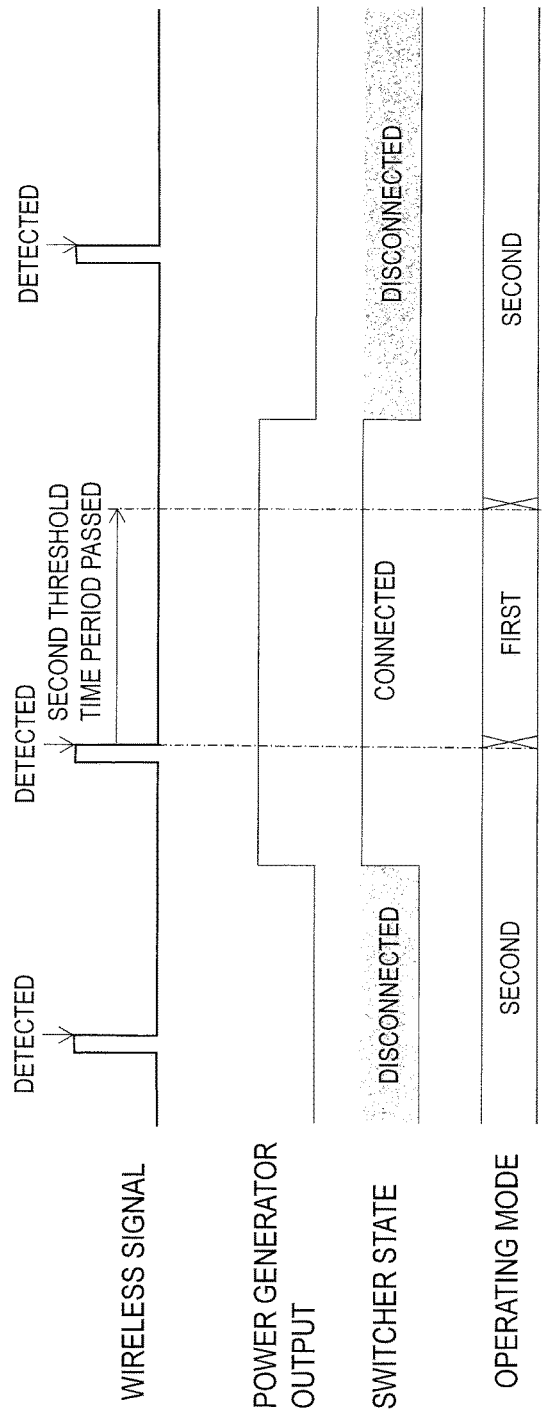
FIG. 10 is a timing chart of a first operating mode and a second operating mode of the bicycle electric component illustrated in FIG. 9 in accordance with the second embodiment.

As seen in FIG. 10, the switcher PSW is configured to change the electric connection state between the wireless communicator WC and the power source PS to an electrically connected state when the electric generator EG of the switcher PSW generates the electric power by the external input to the bicycle 10. The wireless communicator WC is configured to change from the second operating mode to the first operating mode in a state where the wireless communicator WC receives the wireless signal in the electrically connected state. The bicycle component controller CC is configured to change from the first operating mode to the second operating mode in the state where the wireless communicator WC has not received the wireless signal for the second threshold time period.

As for the bicycle electric component 112, the switcher PSW is configured to connect the wireless communicator WC and the power source PS when the bicycle 10 is operated. Accordingly, it is possible to reduce power consumption when the bicycle 10 is not operated. Further, the switcher PSW is actuated by the electric generator EG to generate the electric power by the external input to the bicycle 10. Accordingly, it is possible to reduce power consumption when the bicycle 10 is operated.

Modifications of Second Embodiment

In the second embodiment, the bicycle component controller CC does not need to manage an operating mode of the wireless communicator WC such as the first operating mode and the second operating mode. For example, the bicycle component controller CC can receive a wireless signal during all the electrically connected state of the switcher PSW. In such a case, the bicycle electric component 112 needs to have simple circuitry without a circuit module determining the operating mode. Accordingly, it is possible to further reduce power consumption.

Figure 11:
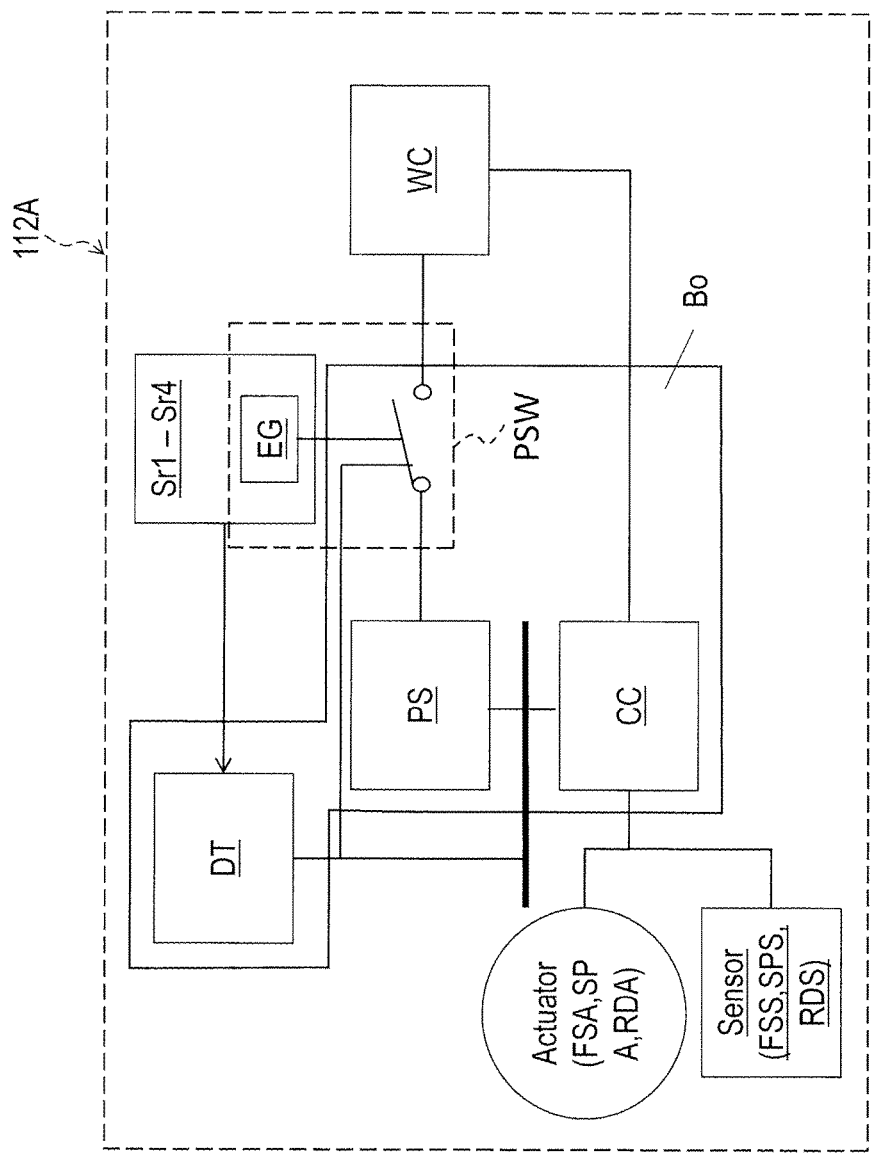
FIG. 11 is a schematic block diagram of a bicycle electric component in accordance with a modification of the second embodiment.

In addition, the bicycle electric component 112 can be applied to the bicycle electric component 12 in the first embodiment. In this case, the bicycle electric component 112 further comprises the detector DT as illustrated in the first embodiment. As seen in FIG. 11, such a bicycle electric component 112 is referred to as the bicycle electric component 112A. In this modification, the electric generator EG can be provided in a rotation sensor Sr1, Sr2, Sr3, or Sr4.

Figure 12:
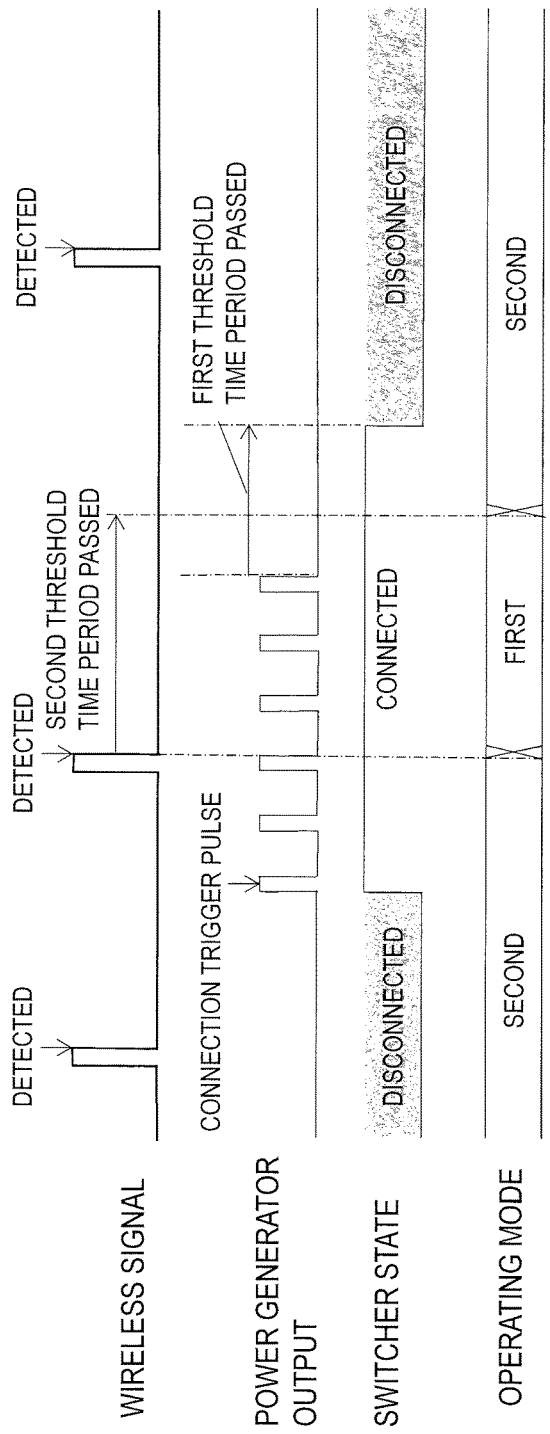
FIG. 12 is a timing chart of a first operating mode and a second operating mode of the bicycle electric component illustrated in FIG. 11 in accordance with the modification of the second embodiment.

As seen in FIG. 12, the switcher PSW is configured to change the electric connection state between the wireless communicator WC and the power source PS to an electrically connected state when the electric generator EG of the switcher PSW generates the electric power by the external input to the bicycle 10. Once the electric connection state is changed to the electrically connected state, the detector DT continues to keep the electric connection state in the electrically connected state until the at least one signal from the at least one of the vibration sensor Sv1, Sv2, the pressure sensor Sp1, Sp2, Sp3, the rotation sensor Sr1, Sr2, Sr3, Sr4, the strain sensor Ss1, Ss2, and the bicycle lock-state sensor Sk indicates the bicycle has not been operated for the first threshold time period. When the detector DT detects that the bicycle has not been operated for the first threshold time period, the detector DT is configured to change the electric connection state to an electrically disconnected state. This means that the detector DT set the electric connection state in the same manner as the detector sets the operational state in the first embodiment.

As for the bicycle electric component 112A, it is possible to activate the wireless communicator WC by the switcher PSW, which is actuated by the electric generator EG to generate the electric power by the external input to the bicycle 10. Accordingly, it is possible to reduce power consumption when the bicycle 10 is operated.

Third Embodiment

A bicycle electric component 212 provided in accordance with a third embodiment will be described below referring to FIG. 13. The bicycle electric component 212 has the same structure and/or configuration as those of the bicycle electric component 112 except that the bicycle electric component 212 comprises a casing 28 and an electromagnetic shield 32 in place of the switcher PSW in the bicycle electric component 112. Thus, elements having substantially the same function as those in the first and the second embodiments will be numbered the same here, and will not be described and/or illustrated again in detail here for the sake of brevity.

Figure 13:
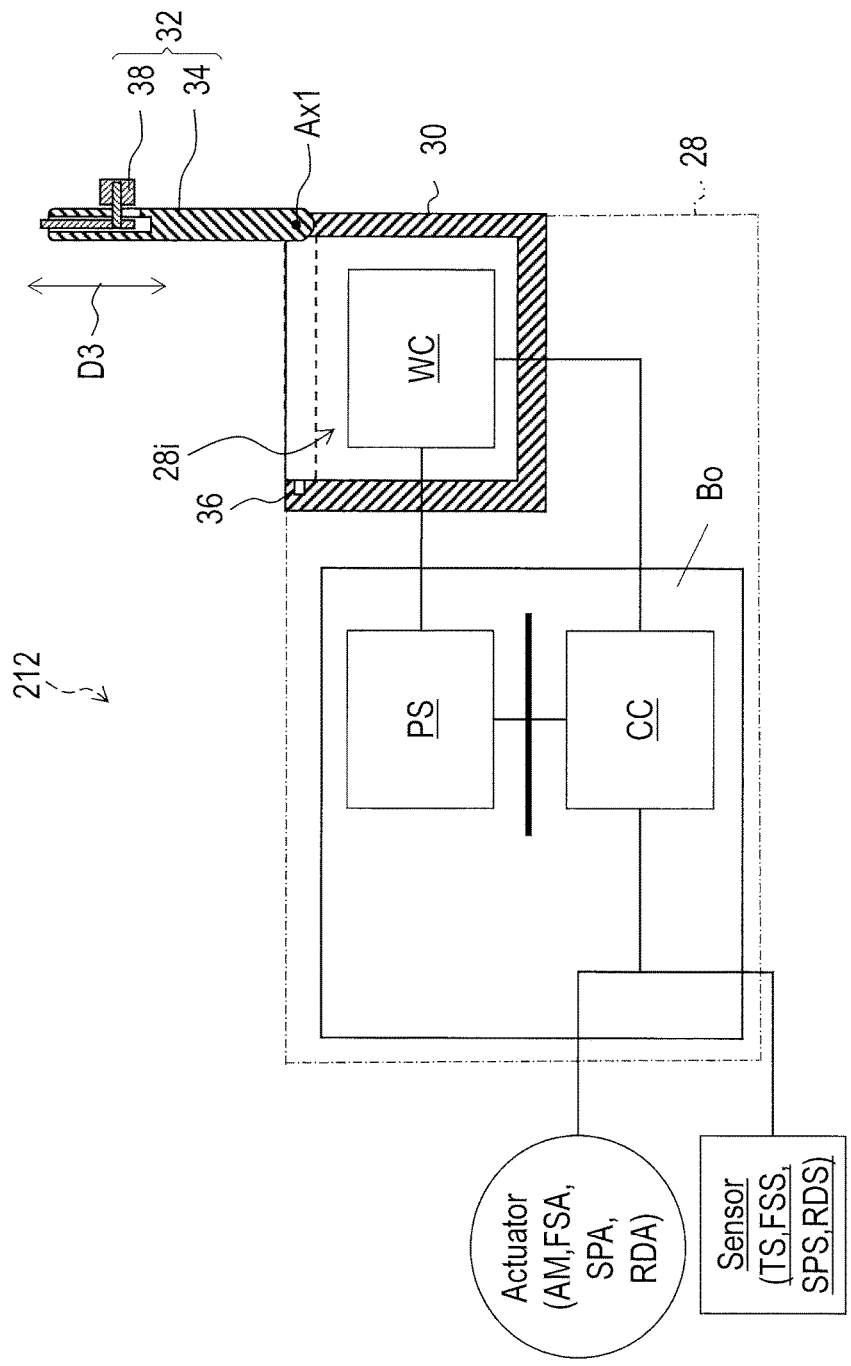
FIG. 13 illustrates a schematic structure of a bicycle electric component in accordance with a third embodiment.

As seen in FIG. 13, the bicycle electric component 212 comprises the wireless communicator WC, the casing 28, and the electromagnetic shield 32. The casing 28 has an internal space 28i. The wireless communicator WC is disposed in the internal space 28i of the casing 28. For example, as seen in FIG. 2, the battery holder BH has its casing 28b. The fourth wireless communicator WC4 is disposed in the casing 28b.

Preferably, as seen in FIG. 13, the casing 28 includes an inner shield member 30 which surrounds the wireless communicator WC. Preferably, the inner shield member 30 is made of soft magnetic material to block radio signals.

The electromagnetic shield 32 includes a shield member 34 to cover at least a part of the wireless communicator WC. In FIG. 13, the shield member 34 covering the at least a part of the wireless communicator WC is indicated by a dotted line. The shield member 34 of the electromagnetic shield 32 is a separate member with respect to the casing 28. Preferably, the shield member 34 is made of soft magnetic material to block radio signals. The electromagnetic shield 32 is movable with respect to the casing 28. For example, the electromagnetic shield 32 is rotatable around a rotational axis Ax1 via a hinge attached to the casing 28.

The casing 28 includes a first connecting member 36. The electromagnetic shield 32 includes a second connecting member 38 to detachably connect the shield member 34 to the first connecting member 36. For example, the first connecting member 36 includes a notch, and the second connecting member 38 includes a latch which is slidable in a lateral direction D3 as shown in FIG. 13. The latch is slidable toward the notch in a state where the electromagnetic shield 32 is closed.

As for the bicycle electric component 212, the user can move the electromagnetic shield 32 to cover the at least a part of the wireless communicator WC to disable or reduce wireless communication when the user does not operate the bicycle 10. Accordingly, it is possible to reduce power consumption when the bicycle 10 is not operated.

In the third embodiment, the bicycle electric component 212 can further comprise the detector DT, and the bicycle component controller CC and the detector DT can perform the same functions as those in the first embodiment.

Fourth Embodiment

A bicycle electric component 312 provided in accordance with a fourth embodiment will be described below referring to FIG. 14. The bicycle electric component 312 has the same structure and/or configuration as those of the bicycle electric component 212 except that the electromagnetic shield 32 moves automatically. Thus, elements having substantially the same function as those in the first to third embodiments will be numbered the same here, and will not be described and/or illustrated again in detail here for the sake of brevity. In the fourth embodiment, the electromagnetic shield 32 and the shield member 34 are referred to as an electromagnetic shield 32m and a shield member 34m, respectively.

In the fourth embodiment, the bicycle electric component 312 comprises the detector DT to detect the operational state of the bicycle 10. Further, the bicycle electric component 312 comprises a shield actuator 40 to move the shield member 34m in response to the operational state of the bicycle 10. In this embodiment, the shield actuator 40 includes a direct-current (DC) motor having a rotational shaft 40s (FIG. 15) with a rotational axis Ax2 which is coupled to the casing 28. Other examples of the shield actuator 40 include a stepper motor and an alternating-current (AC) motor. The shield actuator 40 is configured to rotate the shield member 34m around the rotational axis Ax2. The shield actuator 40 is actuated by the bicycle component controller CC based on the operational state and the non-operational state of the bicycle 10. For example, the shield actuator 40 is configured to move the shield member 34m to uncover at least a part of the wireless communicator WC in a state where the detector DT detects the operational state of the bicycle 10. In FIG. 14, the shield member 34m uncovering the at least a part of the wireless communicator WC is indicated by a dotted line. In this case, the wireless communication is enabled or increased. The shield actuator 40 is configured to move the shield member 34m to cover the at least a part of the wireless communicator WC when the detector DT has not detected the operational state of the bicycle 10 for a third threshold time period. Accordingly, the wireless communication is disabled or decreased. Alternatively or additionally, similarly to the first embodiment, the shield actuator 40 is configured to move the shield member 34m to cover the at least a part of the wireless communicator WC in a state where the wireless communicator WC has not received the wireless signal for a fourth threshold time period.

Figure 15:
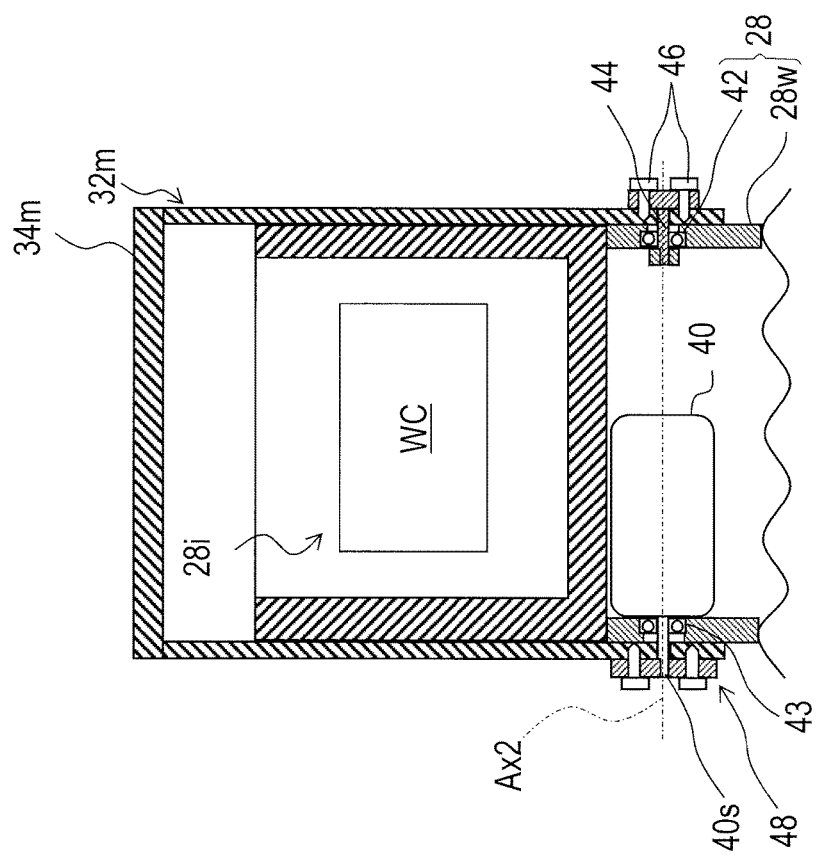
FIG. 15 is a cross-sectional view of the bicycle electric component illustrated in FIG. 14.

In order for the electromagnetic shield 32m to be movable, as seen in FIG. 15, the casing 28 includes a third connecting member 42, and the electromagnetic shield 32m includes a fourth connecting member 44 to movably connect the shield member 34m to the third connecting member 42. Specifically, the casing 28 includes an outer peripheral wall 28w, and the third connecting member 42 is a bearing attached to the outer peripheral wall 28w. The fourth connecting member 44 is a shaft extending from the shield member 34m to be inserted into the bearing. In FIG. 15, the fourth connecting member 44 is a separate member from the shield member 34m, and the fourth connecting member 44 is connected to the shield member via a first attachment member 46 (e.g. a bolt). However, the fourth connecting member 44 can be integrated into the shield member 34m in a one-piece unitary member. Further, the casing 28 can include a fifth connecting member 43 (e.g. a bearing) to movably connect the rotational shaft 40s of the shield actuator 40 to the outer peripheral wall 28w. The rotational shaft 40s of the shield actuator 40 is connected to the electromagnetic shield 32m via a second attachment member 48 (e.g. a coupling and a bolt).

As for the bicycle electric component 312, the shield actuator 40 can automatically move the electromagnetic shield 32m to cover the at least a part of the wireless communicator WC to disable or reduce wireless communication when the bicycle 10 is not operated. Accordingly, the bicycle electric component 312 can provide more convenience to a user than the bicycle electric component 212 in the third embodiment.

In the fourth embodiment, the bicycle component controller CC and the detector DT can perform the same functions as those in the first embodiment.

Fifth Embodiment

A bicycle electric component 412 provided in accordance with a fifth embodiment will be described below referring to FIG. 16. The bicycle electric component 412 has the same structure and/or configuration as those of the bicycle electric component 12 except that the wireless communicator WC has a sensitivity changer SC and that the bicycle component controller CC may not manage the first operating mode and the second operating mode. Thus, elements having substantially the same function as those in the first and the second embodiments will be numbered the same here, and will not be described and/or illustrated again in detail here for the sake of brevity. Specifically, the sensitivity changer SC of the wireless communicator WC in the fifth embodiment is referred to as a sensitivity changer SC1.

Figure 16:
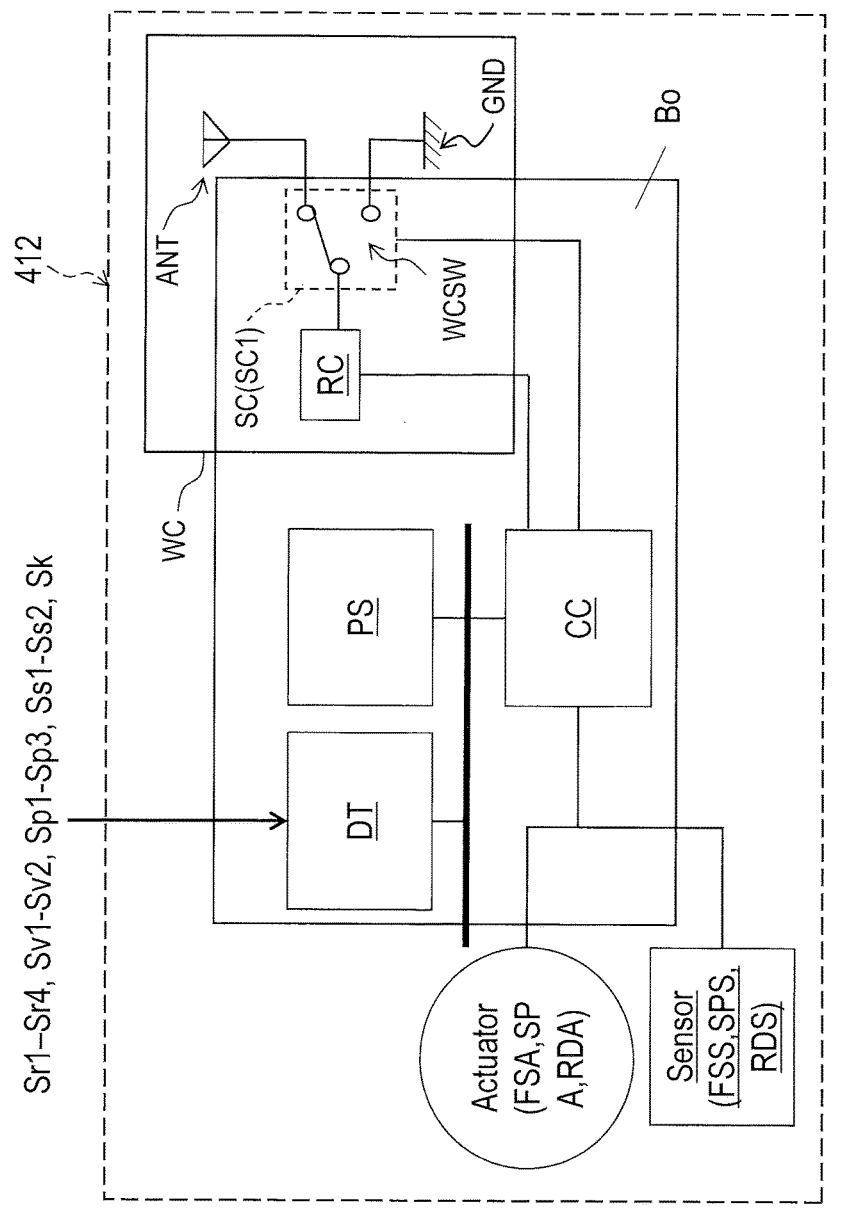
FIG. 16 illustrates a schematic structure of a bicycle electric component in accordance with a fifth embodiment.

As seen in FIG. 16, the bicycle electric component 412 comprises the detector DT and the wireless communicator WC. The wireless communicator WC includes a receiving circuit RC and an antenna ANT. The receiving circuit RC includes a decoder to decode a wireless signal received by the antenna ANT to receive information from the wireless signal. The wireless communicator WC includes a sensitivity changer SC (SC1) to change a sensitivity of the wireless communicator WC.

Specifically, as seen in FIG. 16, the sensitivity changer SC1 includes a first electrical switch WCSW to connect the receiving circuit RC and either of the antenna ANT and an electrical ground GND. In FIG. 13, the electrical ground GND is shown as a frame ground, but the electrical ground GND can be a signal ground. The first electrical switch WCSW is controlled by the bicycle component controller CC based on the operational state of the bicycle 10 which is detected by the detector DT.

The first electrical switch WCSW is controlled to connect the receiving circuit RC and the antenna ANT in a state where the detector DT detects the operational state of the bicycle 10. Accordingly, the sensitivity changer SC (SC1) increases the sensitivity of the wireless communicator WC in a state where the detector DT detects the operational state of the bicycle 10. The first electrical switch WCSW is controlled to connect the receiving circuit RC and the electrical ground GND in a state where the detector DT has not detected the operational state of the bicycle for a fifth threshold time period. That is, the sensitivity changer SC1 is configured to electrically disconnect the receiving circuit RC and the antenna ANT to reduce the sensitivity of the wireless communicator WC in the state where the detector DT has not detected the operational state of the bicycle 10 for the fifth threshold time period. Alternatively or additionally, the first electrical switch WCSW is controlled to connect the receiving circuit RC and the electrical ground GND in a state where the wireless communicator WC has not received the wireless signal for a sixth threshold time period. That is, the sensitivity changer SC1 is configured to electrically disconnect the receiving circuit RC and the antenna ANT to reduce the sensitivity of the wireless communicator WC in a state where the wireless communicator WC has not received the wireless signal for the sixth threshold time period.

As for the bicycle electric component 412, the sensitivity changer SC1 increases the sensitivity of the wireless communicator WC by electrically connecting the receiving circuit RC and the antenna ANT in the state where the detector DT detects the operational state of the bicycle 10. The sensitivity changer SC1 decreases the sensitivity of the wireless communicator WC by electrically connecting the receiving circuit RC and the electrical ground GND in the state where the detector DT has not detected the operational state of the bicycle 10 for the fifth threshold time period and/or the wireless communicator WC has not received the wireless signal for the sixth threshold time period. Accordingly, it is possible to disable wireless communication while the bicycle 10 is not operated, thereby power consumption is reduced when the bicycle 10 is not operated.

Sixth Embodiment

Figure 17:
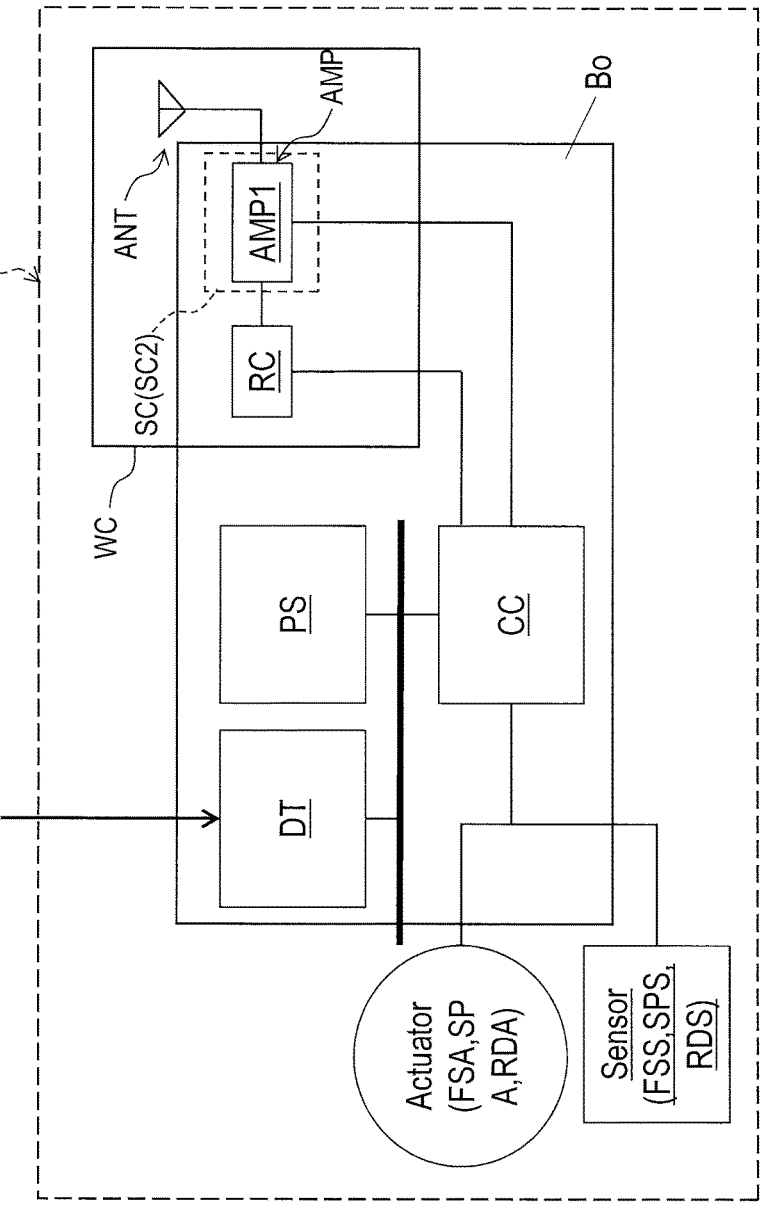
FIG. 17 illustrates a schematic structure of a bicycle electric component in accordance with a sixth embodiment.

A bicycle electric component 512 provided in accordance with a sixth embodiment will be described below referring to FIG. 17. The bicycle electric component 512 has the same structure and/or configuration as those of the bicycle electric component 412 except the sensitivity changer SC. Thus, elements having substantially the same function as those in the fifth embodiment will be numbered the same here, and will not be described and/or illustrated again in detail here for the sake of brevity. Specifically, the sensitivity changer SC of the wireless communicator WC in the sixth embodiment is referred to as a sensitivity changer SC2.

In this embodiment, the wireless communicator WC includes at least one amplifier AMP. More specifically, the sensitivity changer SC2 includes an amplifier AMP1. Preferably, the amplifier AMP1 is a variable gain amplifier. A gain of the amplifier AMP1 is controlled by the bicycle component controller CC based on the operational state of the bicycle 10 which is detected by the detector DT.

The amplifier AMP1 is controlled to increase the gain in a state where the detector DT detects the operational state of the bicycle 10. Accordingly, the sensitivity changer SC (SC2) increases the sensitivity of the wireless communicator WC in a state where the detector DT detects the operational state of the bicycle 10.

The sensitivity changer SC2 is configured to decrease a gain of the at least one amplifier AMP (the amplifier AMP1) in a state where the detector DT has not detected the operational state of the bicycle 10 for a seventh threshold time period. Alternatively or additionally, the sensitivity changer SC2 is configured to decrease a gain of the at least one amplifier AMP (the amplifier AMP1) in a state where the wireless communicator WC has not received the wireless signal for an eighth threshold time period.

As for the bicycle electric component 512, the sensitivity changer SC2 increases the sensitivity of the wireless communicator WC by increasing the gain of the amplifier AMP1 in the state where the detector DT detects the operational state of the bicycle 10. The sensitivity changer SC2 decreases the sensitivity of the wireless communicator WC by decreasing the gain of the amplifier AMP1 in the state where the detector DT has not detected the operational state of the bicycle 10 for the seventh threshold time period and/or the wireless communicator WC has not received the wireless signal for the eighth threshold time period. Accordingly, it is possible to decrease wireless communication while the bicycle 10 is not operated, thereby power consumption is reduced when the bicycle 10 is not operated.

Modifications of Sixth Embodiment

Figure 18:
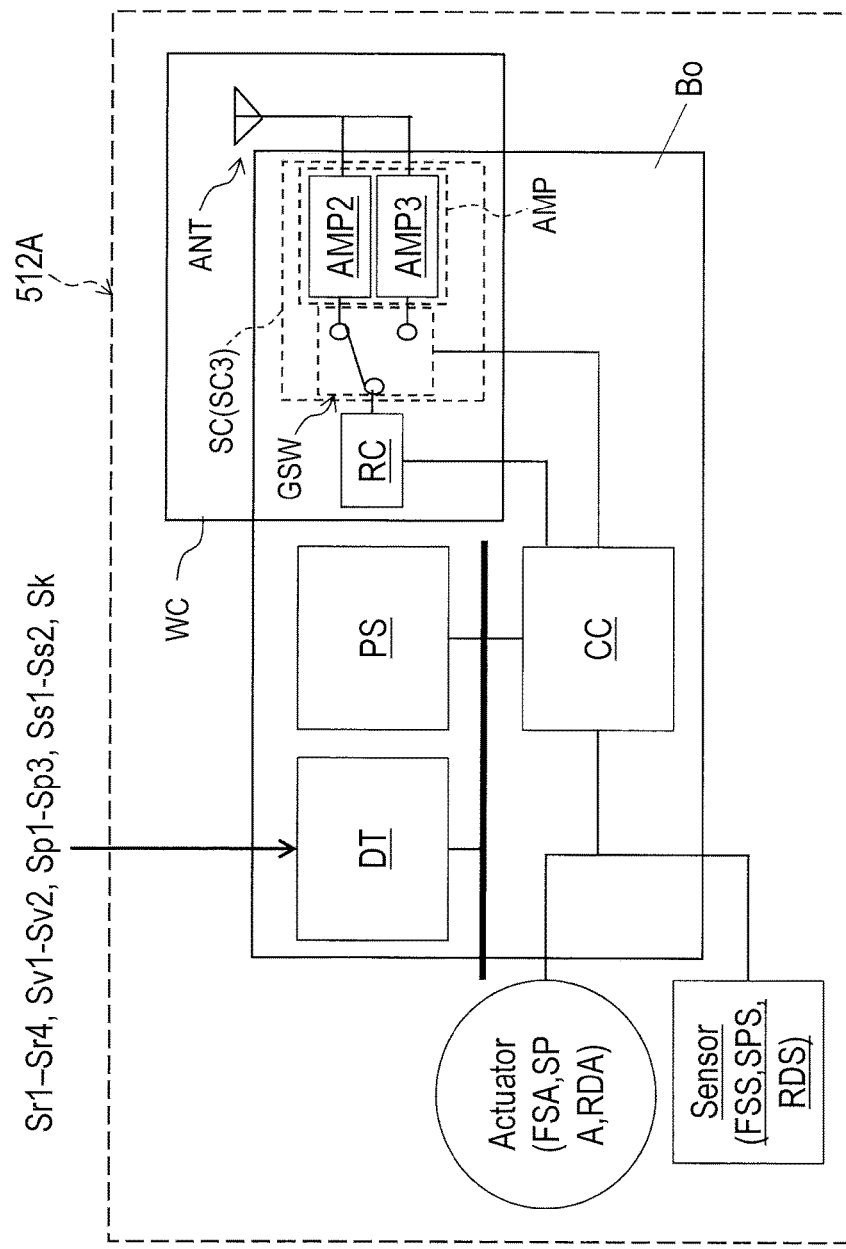
FIG. 18 illustrates a schematic structure of a bicycle electric component in accordance with a modification of the sixth embodiment.

As seen in FIG. 18, the at least one amplifier AMP of the sensitivity changer SC can include a plurality of fixed gain amplifiers AMP2 and AMP3 and a second electrical switch GSW to connect the receiving circuit RC and the antenna ANT via one of the plurality of fixed gain amplifiers AMP2 and AMP3 in place of the variable gain amplifier AMP1. Such a bicycle electric component 512 and such a sensitivity changer SC is referred to as a bicycle electric component 512A and a sensitivity changer SC3, respectively. In the sensitivity changer SC3, a gain of the fixed gain amplifier AMP2 is larger than a gain of the fixed gain amplifier AMP3. Preferably, the gain of the fixed gain amplifier AMP3 is small such that the receiving circuit RC cannot decode a wireless signal amplified by the fixed gain amplifier AMP3. The plurality of fixed gain amplifiers AMP2 and AMP3 are electrically connected to the antenna ANT. The second electrical switch GSW is controlled by the bicycle component controller CC based on the operational state of the bicycle 10 which is detected by the detector DT.

The second electrical switch GSW is controlled to connect the receiving circuit RC and the fixed gain amplifier AMP2 in a state where the detector DT detects the operational state of the bicycle 10. Accordingly, the sensitivity changer SC (SC3) increases the sensitivity of the wireless communicator WC in a state where the detector DT detects the operational state of the bicycle 10. The second electrical switch GSW is controlled to connect the receiving circuit RC and the fixed gain amplifier AMP3 in the state where the detector DT has not detected the operational state of the bicycle 10 for the seventh threshold time period. That is, the sensitivity changer SC(SC3) is configured to decrease a gain of the at least one amplifier AMP in the state where the detector DT has not detected the operational state of the bicycle 10 for the seventh threshold time period. Alternatively or additionally, the second electrical switch GSW is controlled to connect the receiving circuit RC and the fixed gain amplifier AMP3 in the state where the wireless communicator WC has not received the wireless signal for the eighth threshold time period. That is, the sensitivity changer SC(SC3) is configured to decrease a gain of the at least one amplifier AMP in the state where the wireless communicator WC has not received the wireless signal for the eighth threshold time period. In this modification, the sensitivity changer SC3 has the same function as that of the sensitivity changer SC2.

Seventh Embodiment

Figure 19:
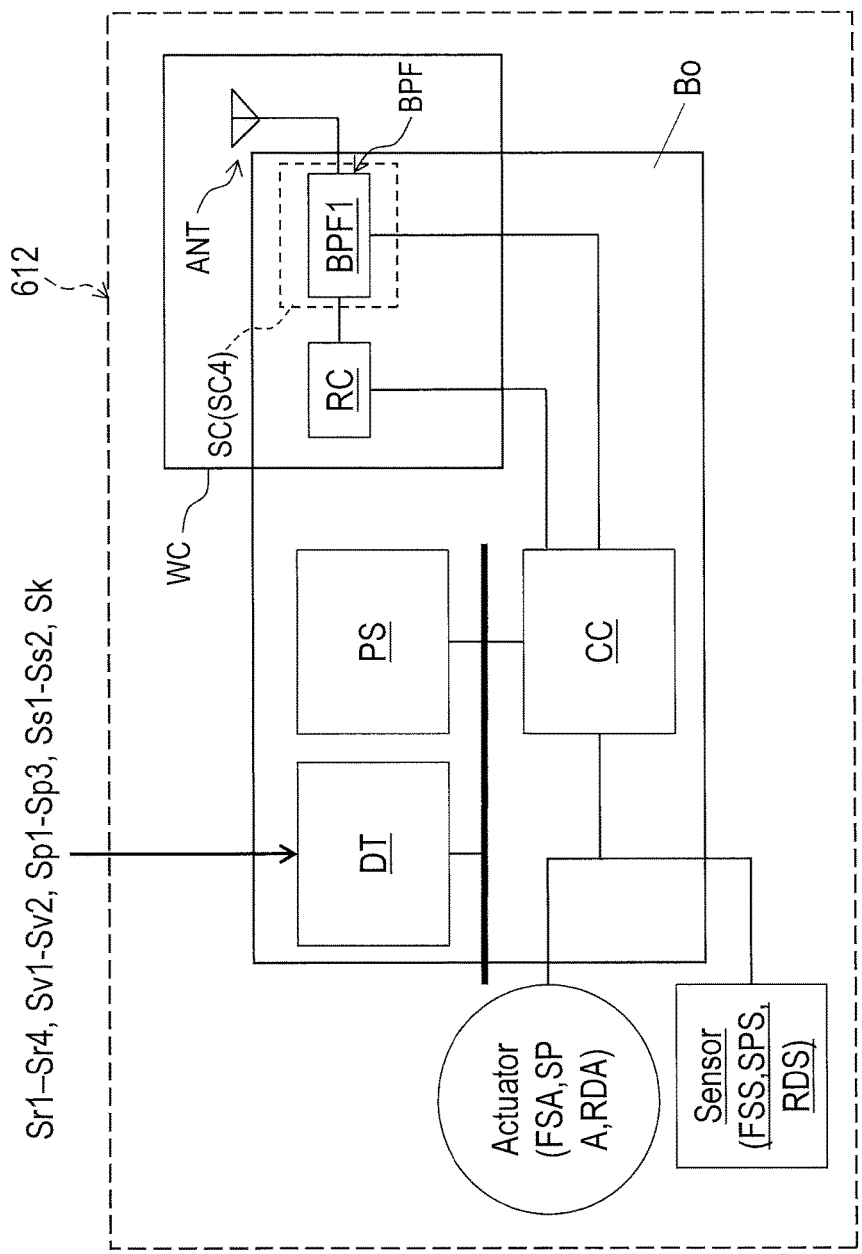
FIG. 19 illustrates a schematic structure of a bicycle electric component in accordance with a seventh embodiment.

A bicycle electric component 612 provided in accordance with a seventh embodiment will be described below referring to FIG. 19. The bicycle electric component 612 has the same structure and/or configuration as those of the bicycle electric component 512 except the sensitivity changer SC.

Thus, elements having substantially the same function as those in the fifth embodiment will be numbered the same here, and will not be described and/or illustrated again in detail here for the sake of brevity. Specifically, the sensitivity changer SC of the wireless communicator WC in the sixth embodiment is referred to as a sensitivity changer SC4.

In this embodiment, the wireless communicator WC includes at least one band pass filter BPF. More specifically, the sensitivity changer SC4 includes a first band pass filter BPF1. The first band pass filters BPF1 is electrically connected to the antenna ANT. Preferably, the first band pass filter BPF1 is a variable band pass filter. A band in which radio passes through the first band pass filter BPF1 is controlled by the bicycle component controller CC based on the operational state of the bicycle 10 which is detected by the detector DT.

The first band pass filter BPF1 is controlled to be tuned to the wireless signals WS11, WS12A, WS12B, WS13, WS21, and WS22 in a state where the detector DT detects the operational state of the bicycle 10. Accordingly, the sensitivity changer SC (SC4) increases the sensitivity of the wireless communicator WC in a state where the detector DT detects the operational state of the bicycle 10.

The first band pass filter BPF1 is controlled to be tuned out of the wireless signals WS11, WS12A, WS12B, WS13, WS21, and WS22 in a state where the detector DT has not detected the operational state of the bicycle 10 for a ninth threshold time period. That is, The sensitivity changer SC(SC4) is configured to control the at least one band pass filter BPF (the first band pass filter BPF1) to block the wireless signal in the state where the detector DT has not detected the operational state of the bicycle 10 for the ninth threshold time period. Alternatively or additionally, the first band pass filter BPF1 is controlled to be tuned out of the wireless signals WS11, WS12A, WS12B, WS13, WS21, and WS22 in a state where the wireless communicator WC has not received the wireless signal for a tenth threshold time period. That is, the sensitivity changer SC(SC4) is configured to control the at least one band pass filter BPF (the first band pass filter BPF1) to block the wireless signal in the state where the wireless communicator WC has not received the wireless signal for the tenth threshold time period.

As for the bicycle electric component 612, the sensitivity changer SC4 increases the sensitivity of the wireless communicator WC by tuning the first band pass filter BPF1 to the wireless signals WS11, WS12A, WS12B, WS13, WS21, and WS22 in the state where the detector DT detects the operational state of the bicycle 10. The sensitivity changer SC4 decreases the sensitivity of the wireless communicator WC by tuning the first band pass filter BPF1 out of the wireless signals WS11, WS12A, WS12B, WS13, WS21, and WS22 in the state where the detector DT has not detected the operational state of the bicycle 10 for the ninth threshold time period and/or the wireless communicator WC has not received the wireless signal for the tenth threshold time period. Accordingly, it is possible to decrease wireless communication while the bicycle 10 is not operated, thereby power consumption is reduced when the bicycle 10 is not operated.

Modification of Seventh Embodiment

Figure 20:
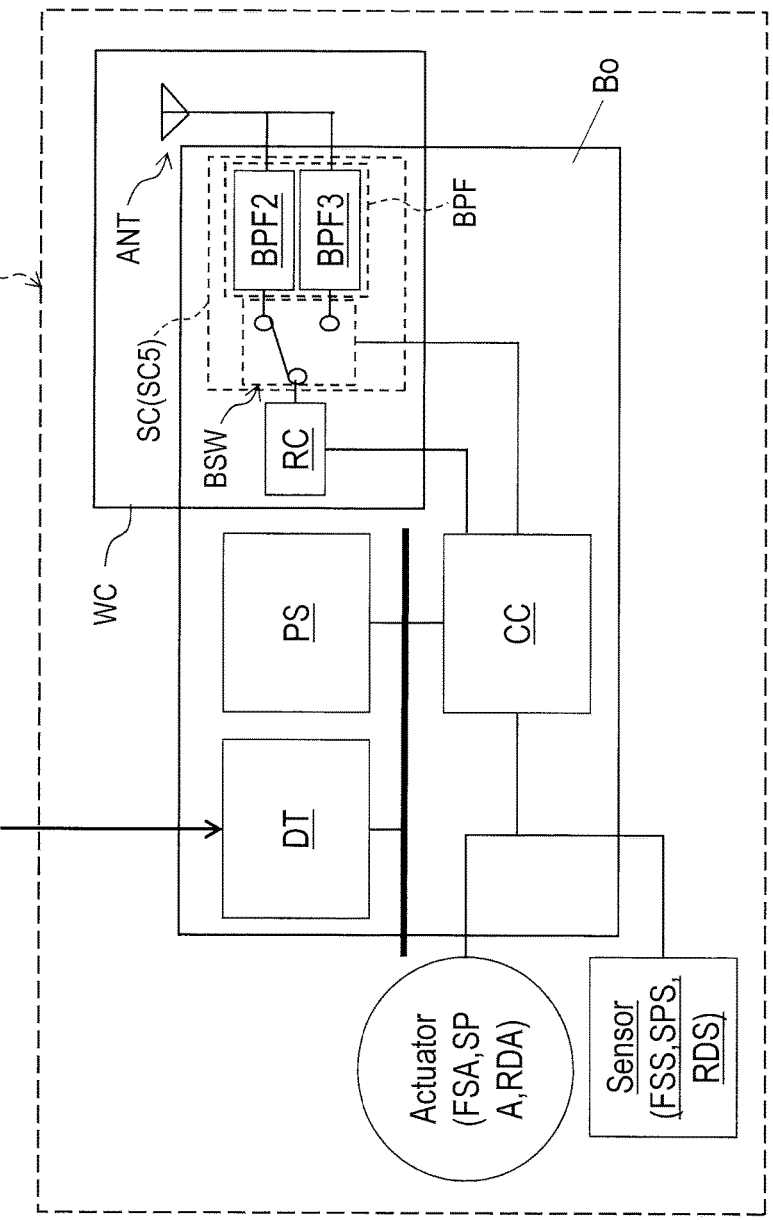
FIG. 20 illustrates a schematic structure of a bicycle electric component in accordance with a modification of the seventh embodiment.

As seen in FIG. 20, the at least one band pass filter BPF of the sensitivity changer SC can include a plurality of band pass filters BPF2 and BPF3 and a third electrical switch BSW to connect the receiving circuit RC and the antenna ANT via one of a second band pass filter BPF2 and a third band pass filter BPF3 in place of the first band pass filter BPF1. Such a bicycle electric component and such a sensitivity changer SC is referred to as a bicycle electric component 612A and a sensitivity changer SC5, respectively. In the sensitivity changer SC5, the wireless signals WS11, WS12A, WS12B, WS13, WS21, and WS22 pass through the second band pass filter BPF2 and the wireless signals WS11, WS12A, WS12B, WS13, WS21, and WS22 don't pass through the third band pass filter BPF3. The second band pass filters BPF2 and the third band pass filter BPF3 are electrically connected to the antenna ANT. The third electrical switch BSW is controlled by the bicycle component controller CC based on the operational state of the bicycle 10 which is detected by the detector DT.

The third electrical switch BSW is controlled to connect the receiving circuit RC and the second band pass filter BPF2 in a state where the detector DT detects the operational state of the bicycle 10. Accordingly, the sensitivity changer SC (SC5) increases the sensitivity of the wireless communicator WC in the state where the detector DT detects the operational state of the bicycle 10. The third electrical switch BSW is controlled to connect the receiving circuit RC and the third band pass filter BPF3 in a state where the detector DT has not detected the operational state of the bicycle 10 for a ninth threshold time period. That is, the sensitivity changer SC (SC5) is configured to control the at least one band pass filter BPF (the third band pass filter BPF3) to block the wireless signal in the state where the detector DT has not detected the operational state of the bicycle 10 for the ninth threshold time period. Alternatively or additionally, the third electrical switch BSW is controlled to connect the receiving circuit RC and the third band pass filter BPF3 in the state where the wireless communicator WC has not received the wireless signal for a tenth threshold time period. That is, the sensitivity changer SC(SC5) is configured to control the at least one band pass filter BPF (the third band pass filter BPF3) to block the wireless signal in the state where the wireless communicator WC has not received the wireless signal for the tenth threshold time period. In this modification, the sensitivity changer SC5 has the same function as that of the sensitivity changer SC4.

Other Modifications

In the above embodiments, the bicycle component controller CC is configured to control the wireless communicator WC (e.g. change the first and second operating modes), the shield actuator 40, the first to third electrical switches WCSW, GSW, BSW, and the gain of the variable gain amplifier AMP. However, the detector DT can be configured to control them on behalf of the bicycle component controller CC.

Figure 14:
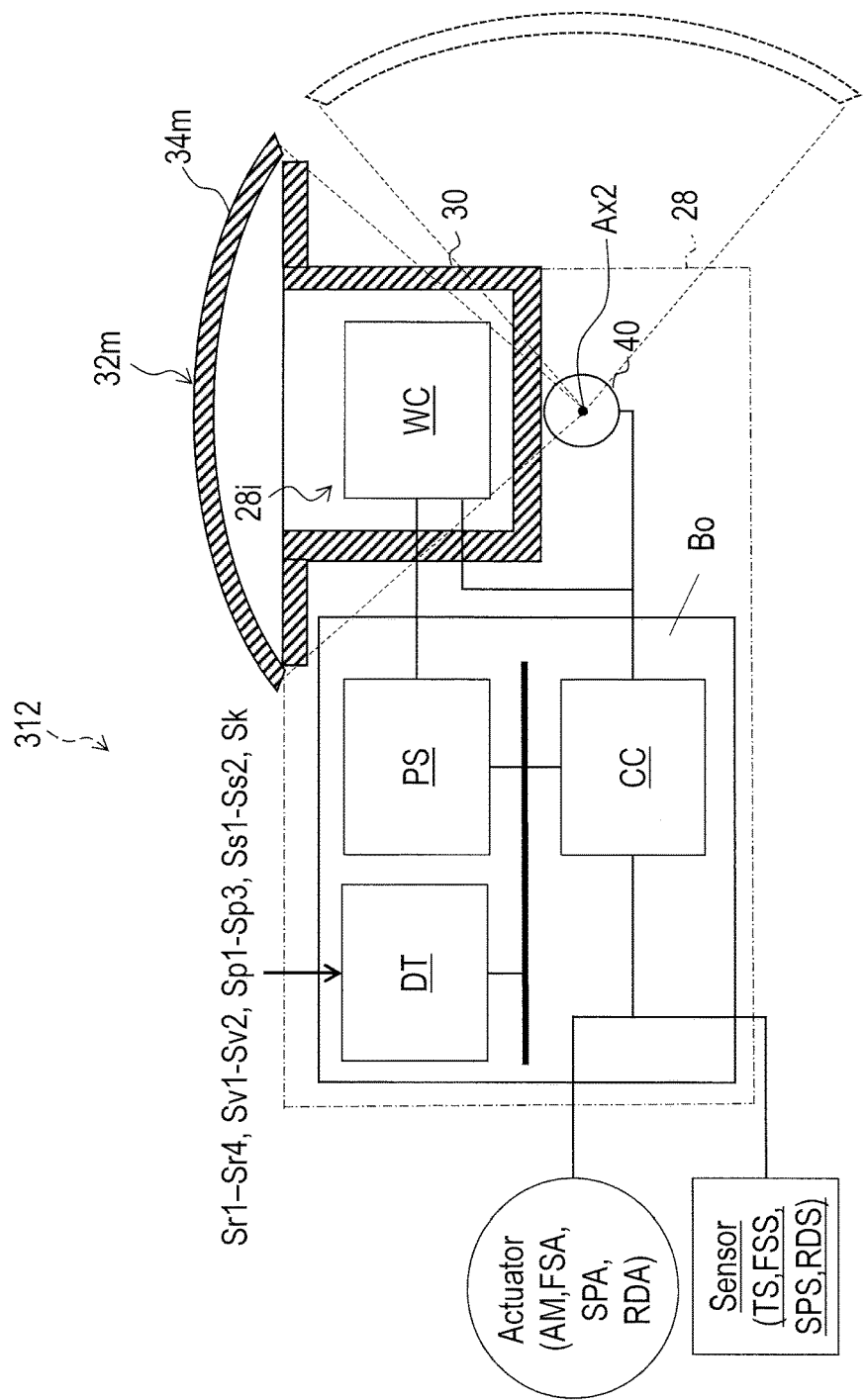
FIG. 14 illustrates a schematic structure of a bicycle electric component in accordance with a fourth embodiment.

Shapes of the casing 28 and the electromagnetic shield 32, 32m can be different from those illustrated in FIGS. 13 to 15, as far as the functions of them don't change.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element." Further, some of the first threshold time period to the eighth threshold time period may have a same time length, but all of them may have a different time length.

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle electric component comprising:
   an electric actuator;
   a detector configured to determine whether a bicycle is in an operational state or in a non-operational state based on an output from at least one sensor;
   a wireless communicator configured to receive a wireless signal, the wireless communicator having a plurality of operating modes including a first operating mode and a second operating mode, a power consumption of the second operating mode being lower than a power consumption of the first operating mode, the wireless signal including a control signal to control the electric actuator, the wireless communicator being activated in both the first operating mode and the second operating mode; and
   a bicycle component controller configured to control the electric actuator based on the control signal received by the wireless communicator,
   the bicycle component controller being configured to change an operating mode of the wireless communicator to the first operating mode when the wireless communicator receives the wireless signal in a state where the detector determines the bicycle is in the operational state while the wireless communicator is in the second operating mode,
   the wireless communicator continuing to be in the second operating mode regardless of a time for which the detector determines the bicycle is in the non-operational state if the bicycle component controller does not change the operating mode of the wireless communicator to the first operating mode.

2. The bicycle electric component according to claim 1, comprising:
   a bicycle component controller configured to change from the first operating mode to the second operating mode in a state where the detector determines the bicycle is in the non-operational state for a first threshold time period.

3. The bicycle electric component according to claim 1, comprising:
   a bicycle component controller configured to change from the first operating mode to the second operating mode in a state where the wireless communicator has not received the wireless signal for a second threshold time period.

4. The bicycle electric component according to claim 1, wherein the detector includes at least one of a vibration sensor, a pressure sensor, a rotation sensor, a strain sensor, and a bicycle lock-state sensor.

5. The bicycle electric component according to claim 1, comprising:
   at least one of a derailleur, an adjustable seatpost, a suspension, and an auxiliary drive unit.

6. The bicycle electric component according to claim 1, further comprising:
   a processor, and a memory, wherein the component controller and the detector are constituted by the processor and the memory.

7. The bicycle electric component according to claim 6, further comprising:
   a circuit board, wherein the processor and the memory are mounted on the circuit board.

8. The bicycle electric component according to claim 1, further comprising:
   a circuit board, a processor, an additional processor, a memory, and an additional memory, wherein the component controller is constituted by the processor and the memory, and the detector is constituted by the additional processor and the additional memory.

9. The bicycle electric component according to claim 8, further comprising:
   a circuit board, wherein the processor, the additional processor, the memory, and the additional memory are mounted on the circuit board.

* * * * *